United States Patent [19]

Neubauer

[11] Patent Number: 5,758,348

[45] Date of Patent: May 26, 1998

[54] METHOD FOR GENERICALLY MANIPULATING PROPERTIES OF OBJECTS IN AN OBJECT ORIENTED REPOSITORY

[75] Inventor: Ronald Jay Neubauer, Thousand Oaks, Calif.

[73] Assignee: Unisys Corp., Blue Bell, Pa.

[21] Appl. No.: 506,647

[22] Filed: Jul. 25, 1995

[51] Int. Cl.$^6$ .................................................. G06F 17/30
[52] U.S. Cl. .......................... 707/103; 707/202; 707/204
[58] Field of Search ............................ 395/614; 707/103, 707/202, 204

[56] References Cited

U.S. PATENT DOCUMENTS

| | | | |
|---|---|---|---|
| 5,261,098 | 11/1993 | Katin et al. | 395/650 |
| 5,347,653 | 9/1994 | Flynn et al. | 395/600 |
| 5,361,350 | 11/1994 | Conner et al. | 395/600 |
| 5,418,964 | 5/1995 | Conner et al. | 395/700 |
| 5,428,792 | 6/1995 | Conner et al. | 395/700 |

*Primary Examiner*—Paul R. Lintz
*Assistant Examiner*—Cheryl R. Lewis
*Attorney, Agent, or Firm*—J. Ronald Richebourg; Mark T. Starr; Steven R. Petersen

[57] ABSTRACT

The method of the present invention defines a method in a computer system having a user interface, a memory, a repository and a database, and a repository program operating in the computer system for generically manipulating properties of objects stored in the repository. The program executes a method comprising the steps of determining if the current value of the property is known, and if not; determining if the current value of the property is needed, and if so; calling getProperty to retrieve the current value of the property; determining if the value of the property is to be changed, and if so; calling setProperty to alter the value of the property.

32 Claims, 27 Drawing Sheets

Microfiche Appendix Included
(1 Microfiche, 21 Pages)

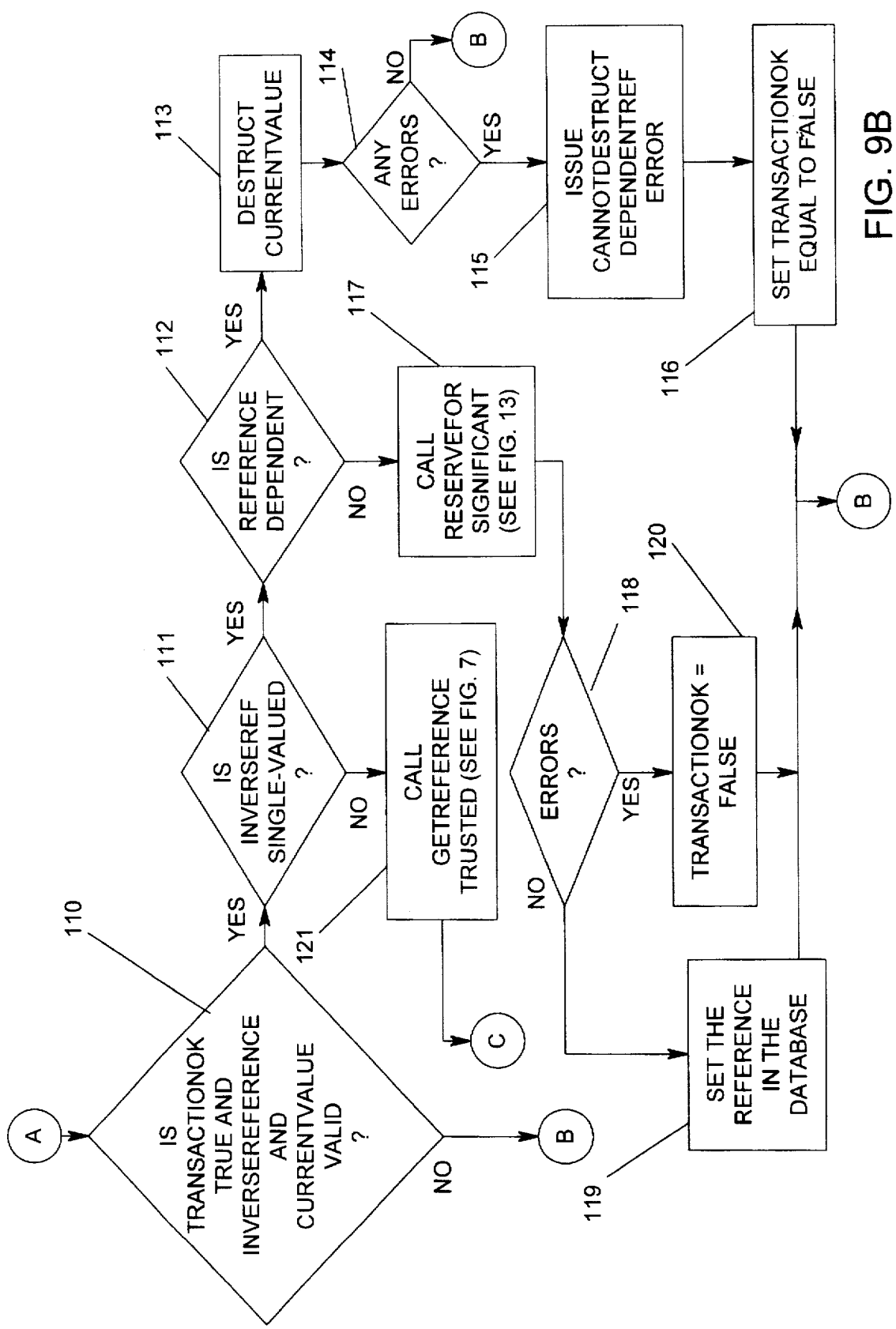

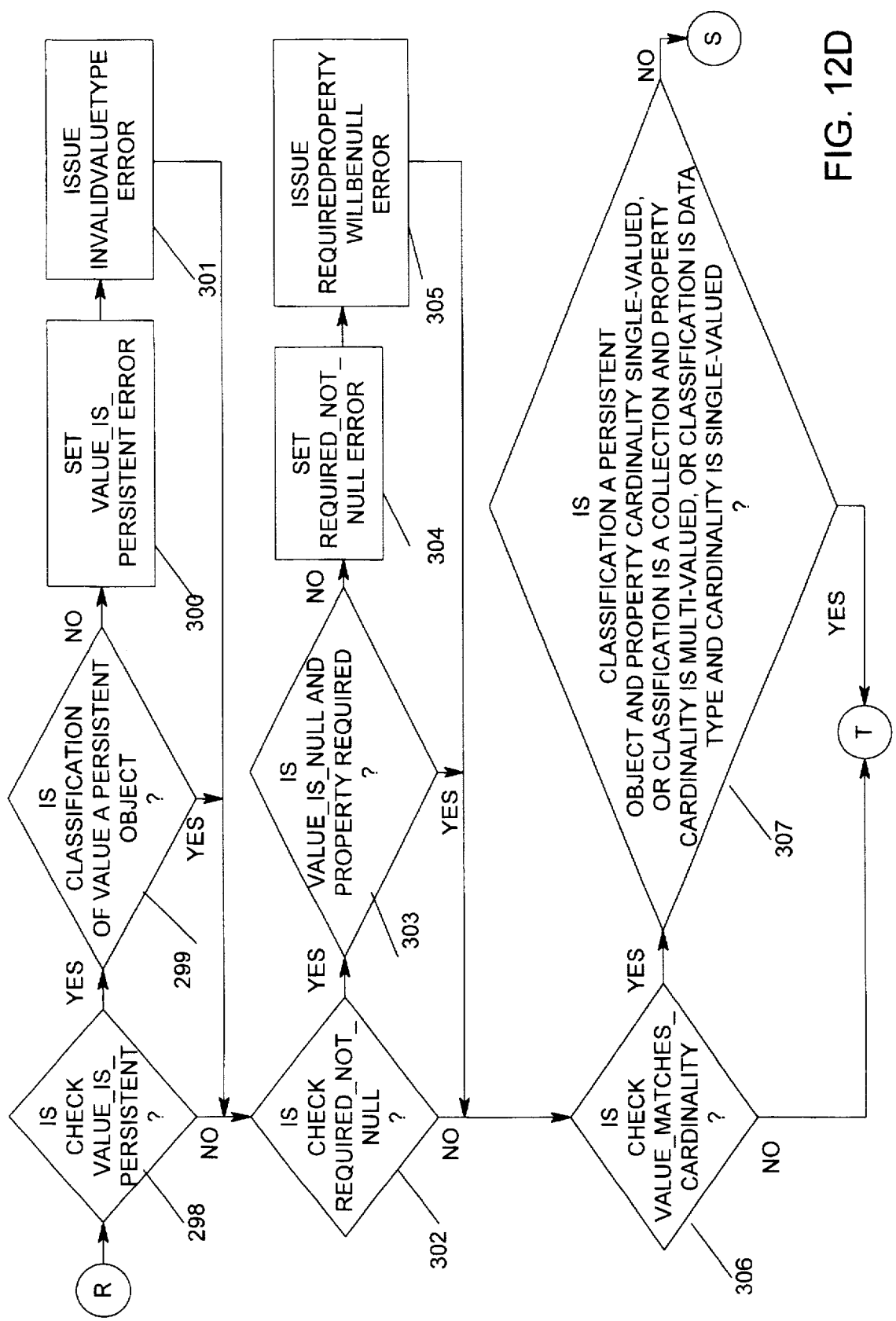

METHOD FOR GENERICALLY MANIPULATING PROPERTIES OF OBJECTS IN AN OBJECT ORIENTED REPOSITORY

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

A microfiche Appendix illustrating the pseudo code for the present invention (comprising 21 frames) is included in the U.S. Patent Office files relating to this invention.

FIELD OF THE INVENTION

The present invention relates in general to the field of repository databases and in particular to a method for generically manipulating properties of objects in an object oriented repository, which objects continue to exist beyond the execution of a particular tool of the repository.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. A repository is like a card catalog that is found in the library, with the library being analogous to the database.

With the advent of repositories, improvements in the accessibility of data within databases has improved. However, as these repositories have become larger and more complex a method is required for defining, tracking and maintaining objects in an object oriented repository.

BRIEF SUMMARY OF THE INVENTION

It is therefore an object of the present invention to provide an improved repository system.

It is another object of the present invention to provide an improved repository which supports modeling.

Yet another object of the present invention is to provide a method to enable tools to be developed to manipulate properties of persistent objects dynamically. That is, with the use of this invention a tool can be developed without full knowledge of the models, types and properties which will exist in the repository when executed.

The method of the present invention defines a method in a computer system having a user interface, a memory, a repository and a database, and a repository program operating in the computer system for generically manipulating properties of objects stored in the repository. The program executes a method comprising the steps of determining if the current value of the property is known, and if not; determining if the current value of the property is needed, and if so; calling getProperty to retrieve the current value of the property; determining if the value of the property is to be changed, and if so; calling setProperty to alter the value of the property.

BRIEF DESCRIPTION OF THE DRAWINGS

FIGS. 9A through 9D combined form a flow chart illustrating the steps of the process for setting a property which is a persistent object (i.e., setProperty_PersistentObject).

FIGS. 12A through 12G combined form a flow chart illustrating the steps of the process for checking generic preconditions (i.e., checkGenericPreconditions).

DETAILED DESCRIPTION

Before proceeding with a detailed description of the method of the present invention a background discussion of repositories in which the present invention is useful would be helpful. In general, a repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules.

Figure 1:
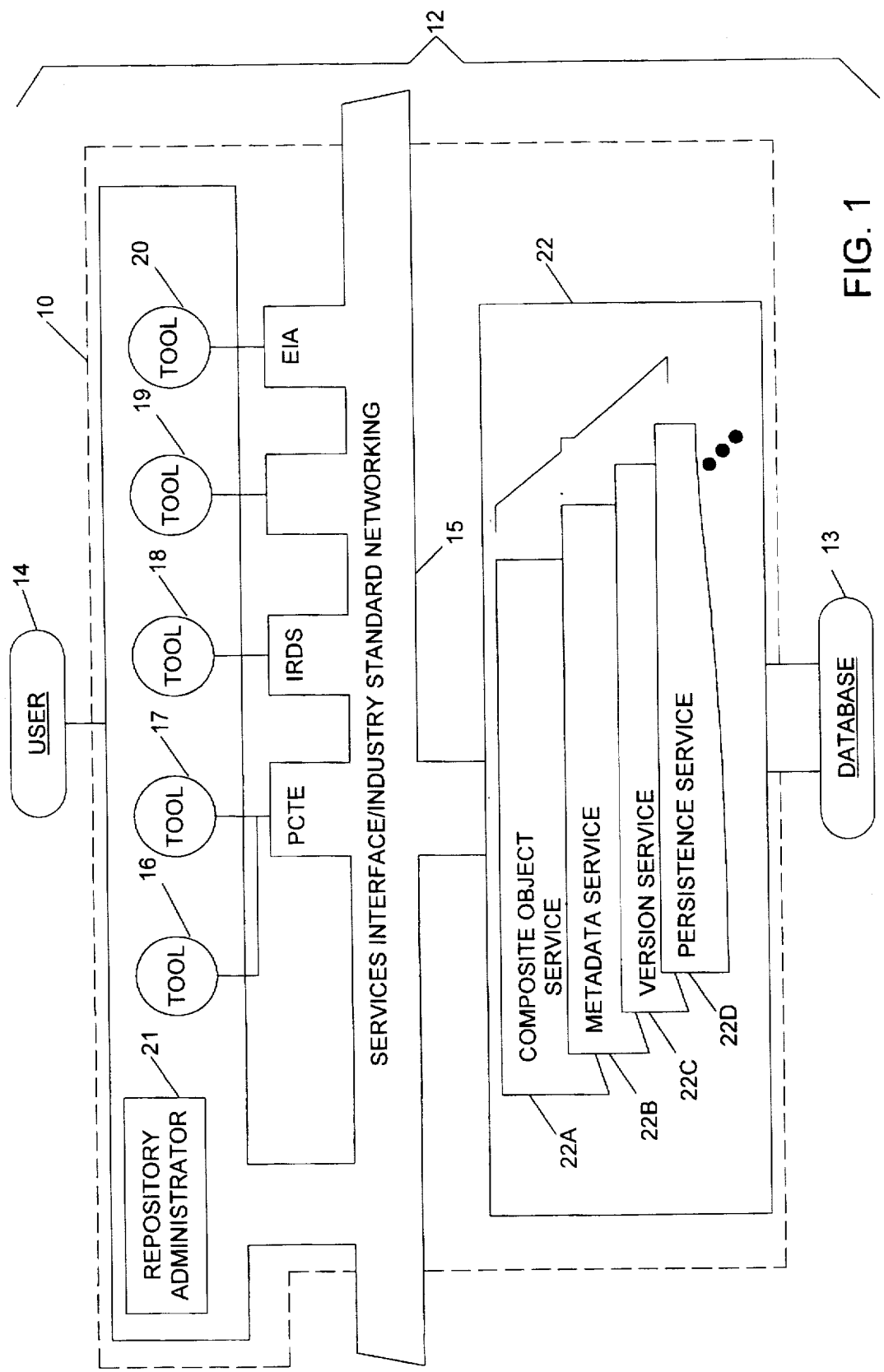
FIG. 1 is a block diagram of a repository showing the various components of software that support the repository (including the method of the present invention) with connections to an information system.

Referring now to the drawings and FIG. 1 in particular, a block diagram is shown of a computer system 12 including a repository 10 that may use the method of the present invention. The repository 10 is illustrated as being supported by or a part of an information system 12 having a user interface 14. Tools 16-20 (such as CASE tools), which are integrated within the repository 10, are coupled to a services interface 15. The tools 16 and 17 are coupled to the interface 15 by means of an interface agent identified as Portable Common Tool Environment ("PCTE"), tool 18 is coupled to the interface 15 by means of an Information Resource Dictionary System ("IRDS") and tool 20 is coupled to the interface by means of an Electronic Industry Associates ("EIA") interface agent. The point here is to illustrate the flexibility of use of a variety of tools and interface agents with the repository 10.

An administrator 21 manages the repository 10, the database 13 and the environment around the repository. The administrator 21 is typically a work station that can manage a single repository or a network of repositories.

A service library 22 provides the functionality that enables the user to store, manage and reuse repository information. Examples of services within the library 22 are Composite Object Service 22a, which is disclosed in U.S. Pat. No. 5,557,793 assigned to the assignee of this application and entitled IN AN OBJECT ORIENTED REPOSITORY, A METHOD OF TREATING A GROUP OF OBJECTS AS A SINGLE OBJECT; and MetaData Service 22b, which is disclosed U.S. Pat. No. 5,644,764 also assigned to the assignee of this application and entitled A METHOD FOR SUPPORTING OBJECT MODELING IN A REPOSITORY. Another library service, Version Service 22c, is disclosed in U.S. Pat. No. 5,581,755 assigned to the assignee of this application and entitled A METHOD FOR MAINTAINING A HISTORY OF SYSTEM DATA AND PROCESSES FOR AN ENTERPRISE. Yet another library service, Persistence Service 22d, is the subject of this patent application. It is noted that many more types of library services may form a part of such a repository, the details of which are beyond the scope of this patent.

The repository employing the present invention provides a client/server architecture in which clients, i.e. tools 16-20, request services form the server, i.e. the repository 10 and its service library 22. In return, the repository and its service library 22 respond to requests from client tools 16-20. A repository client is software that accesses or modifies information that is maintained by the repository. The repository client uses the service library 22 (i.e., the server), which includes software integrated into the repository to manage repository information and provide services to users of that information. It is noted that software in the repository can act both as a repository client when the software is requesting a service from some other repository software and as a repository server when the software is providing a service to some other repository software.

It is pointed out that a SPARC system manufactured by Sun Microsystems, Inc. of Mountain View, Calif., was used for executing one embodiment of the method of the present invention, which method was written in C++ programming language.

As a repository user, one can access the information in the repository through the tools 16-20 that have been integrated within the repository. In the context of a repository, a "tool" is any application software that creates, modifies or uses information in the repository. Tools primarily use the repository for sharing information with other tools and tool users.

For example, a COBOL compiler and a user-interface tool can share the definition of a data structure. Tools also benefit from using the repository services that provide features such as a version control and network distribution. A wide variety of tools serving many diverse purposes can use a repository. A catalog of such tools includes integrated computer-aided software engineering (CASE) and fourth generation language (4GL) tools, enterprise modeling tools, analysis and design specification tools, project planning tools, word processors, graphics tools, source code editors, compilers, linkers, debuggers, etc.

The method of the present invention, or the Persistence service 22d, enables the user to define a complex structure in the repository and to keep track and maintain objects of that structure. For example, to store a complex program in the repository the user might define one type to represent the program as a whole, one type to represent the code modules, and another type to represent the data files. The user then stores the actual code modules and data files as instances of these types. The program object is the composite object that links the modules and files to represent the unified program.

At this juncture of the description several definitions would be helpful.

Types

A type is a template that describes a set of features, i.e the state and behavior—that an object or another type can possess. A type defines a pattern that can be used to create or identify objects; and, it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values. The values represented by the data types do not exist as separate objects in the repository. Instead, they are always sorted as part of a repository object.

Persistent types define objects that continue to exist within the repository beyond the execution of a particular tool or of the repository. These persistent objects are essentially permanent—they remain in the repository until they are explicitly deleted by users. The majority of repository types are persistent, and the steps for defining, tracking and maintaining such types is the subject of this patent.

A transient type defines a temporary object that will be automatically deleted when the function or program in which the object was created exists or terminates. Transient types are provided in the model to support exchange of data between an application and the repository.

A type that can be used to define other types and objects is said to be instantiable. Objects derived from a type are called instances of that type. Types derived from a type are called subtypes of that type. Instances and subtypes of a type inherit the features, (i.e., attributes, references, and operations) defined for that type. The repository User type is an example of an instantiable type. A type that is used to define only other types and not objects is said to be abstract.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes. A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

Features

A feature defines some element of either the state or the behavior that objects can possess. A feature is defined for a type, but as applied to the corresponding objects. The repository has two kinds of features: operations and properties. For example, the Employee type might define the features name, birthDate, salary, and setSalary. Each employee object is subsequently considered to possess these features. That is, each employee has a name, a birth date, and salary. The employee's salary can be modified by using the setSalary feature.

There are two basic categories of features: properties and operations. Properties define state. For example, the salary feature is a property that defines an employee's current salary. Operations define behavior. For example, the setSalary feature is an operation that defines the mechanism for changing an employee's salary.

Properties

A property is a feature that represents a state that objects can possess. (In some models, properties are called instance variables.) A property can represent either a single value or a set of values. Properties are further divided into attributes, whose values are embedded within the owning objects, and references, whose values are independent objects.

The repository supports the following kinds of properties:

Attribute

A property for which the value is embedded within the owning object. For example, an employee's social security number can be defined as an attribute whose value is stored as a string within the employee object.

Reference

A property for which the value is maintained outside the owning object. For example, the employee's manager can be defined as a reference that identifies a separate employee object that represents the manager.

Every property has a domain that identifies the objects that the value of the property can hold. The domain is defined as a type. Objects that are instances of the type are legal values for the property. For example, the domain of the boss property of the Employee type might be specified as the Manager type. Therefore, only a manager object can be designated as the boss of an employee.

When an object is first created, none of its properties have values until they are implicitly assigned a default value or explicitly assigned a value by the construct operation. Until a property has a value it is considered undefined. For properties that are references, the value is considered null. The state of being null is not a value itself. Rather, it means that no value exists.

A property for which the value is embedded within the owning object is called an attribute. Such a property typically is used for simple values that are not shared between multiple owning objects. For example, the Employee property birthDate is simply a Date object—that is, the domain of the birthDate property is the Date type. If one employee's birthDate property is changed, the change does not affect other employees whose birthDate property is the same date. Consequently, each employee object should use a "private" date object that is embedded within it—that is, as an attribute.

A property for which the value is maintained outside the owning object is called a reference. For a reference, the owning object points to the value object. One reason for defining a property as a reference is to allow object sharing. A reference enables two or more owning objects to have the same value for a property. All owning objects can point to the same value object. For example, if two employees have the same manager as a boss, they share the same manager object. Consequently, any changes to the manager (such as changing his or her name) are reflected when the boss reference is accessed for all employees that have that boss.

A property that has one value for each object is said to be single valued. For example, each employee has one name and one birth date. A property that has more than one value for each object is said to be multi-valued. For example, each manager manages multiple employees, so the staff property for a manager object must be able to reference multiple values. A multi-valued property is defined by specifying a collection as its domain. A collection represents a set of values. A collection provides the ability to count the values defined for a multi-valued property, to add new values to the property, and to delete existing values.

The repository supports several types of collections, each of which organizes elements in a different manner. This capability enables the user to:

Store and retrieve the elements in a special order; and,

Search for elements in a special way.

The collection types supported by the repository are summarized in the following table:

| Type | Description |
| --- | --- |
| Array | Creates a dynamic array of objects in which an integer index can be used to access array members. An array can contain duplicate objects. |
| List | Creates an ordered collection of objects. A list can contain duplicate objects. |
| Set | Creates an unordered collection of objects. Objects in a set must be unique. |

Operations

An operation is a feature that represents a behavior that objects can possess. An operation can be thought of as a function: it has a name, an optional set of parameters, and an optional return type. Like properties, operations are applied to each object within the owning type. Consequently, an operation is generally invoked in the context of a specific object.

An operation can have parameters that identify information a caller must provide when invoking the operation.

If an operation has no parameters, a caller merely invokes the operation for the desired object. For example, consider the following features:

| Type | Feature | Domain/Return Type |
| --- | --- | --- |
| Employee | birthDate (attribute) age (operation) | Date Integer |

As shown, the birthDate attribute has a domain of Date. Age is an operation (with no parameters) whose return type is Integer. The purpose of age is to compute an employee's current age (in years) from his or her birth date. Because the age operation is invoked for a specific employee, it is able to obtain the value of that employee's birthDate attribute, make the necessary computation, and return the appropriate integer without requiring parameters.

When an operation has parameters, each parameter has semantics similar to those of properties. Each parameter has a name, a domain type, and a set of options that can be used to affect the behavior of the parameter. The following table shows an example of an operation, defined for the Employee type, that has parameters:

| Operation | Parameter | Parameter Domain | Parameter Options |
|---|---|---|---|
| setSalary | amount | Real | REQUIRED |
| | authorizedBy | Manager | REQUIRED |
| | effective | Date | DEFAULT today's date |

The setSalary operation has three parameters:

The amount parameter is a Real number (floating-point) that is required. Therefore, the caller must specify a value for this parameter.

The authorizedBy parameter is a Manager object that also is required.

The effective parameter is a date parameter that is not required. However, if the caller does not specify a value for this parameter, the current system date is used by default.

A multi-valued parameter is a set, or collection, of values. Such a parameter is useful when the operation must operate on several objects even though it is invoked in the context of a single object. An operation optionally can return an object when it completes processing, just as a program function can return a value. An operation that returns an object is called typed because it has a return type specified. An operation that does not return an object is called un-typed because it does not have a return type specified. A return type must be one of the types recognized by the repository. An operation can return a set of objects by specifying a collection as its return type.

An operation can be defined for a type and then redefined for each subtype of the original type. This process is called overriding an operation.

When an operation is overridden, a subtype that inherits the operation has a separate method that redefines the functionality of that operation. The technique that the repository uses to choose which method to call for a given operation is called dynamic binding.

Dynamic binding (also called polymorphism) means that the repository chooses the method that is most specific for a given object and operation. The most specific method is the one defined in the lowest subtype of which the object is an instance.

For example, assume setSalary is an operation defined for the Employee type. An employee object can be an instance of the Employee type or one of its subtypes.

If you call the setSalary operation for an object that is an Employee instance, the repository selects the method associated with the setSalary operation defined for the employee type.

If you call the setSalary operation for an object that is a Manager instance, the repository selects the method associated with the setSalary operation as it is redefined for the Manager type. If the manager type does not redefine the setSalary operation, the repository selects the method associated with the setSalary operation defined for the Employee type as the immediate supertype of the Manager type.

You can define an operation to be called with different sets of parameters. For example, you might define the setSalary operation to be called with only an amount parameter or with both an amount parameter and an effectiveDate parameter.

Each combination of parameters that an operation can accept is called a signature. To define multiple signatures for an operation, you define the operation more than once in the same owner type and use the desired signature for each definition.

Methods

The operations defined for a model form an interface that can be seen by a caller. Separate from this definition, each operation must be implemented by a module of code called a method. Methods are typically written as separate functions and bound into a set of code libraries. The method code library name for each operation is then identified to the repository as part of the definition of the operation.

When a caller invokes an operation, the request is received by the repository, which finds and calls the appropriate method. The operation passes to the method the appropriate parameters. When a method is called, it can then act as a caller and call back into the repository to invoke other operations. Consequently, a method can be thought of as a specialized kind of application program.

Objects

An object is an abstract representation of a real-world concept or thing—such as a person, a software package, or an event—that is stored in the repository. In the repository, the state of an object is represented by the values of the properties defined for the type. For example, the state of an integer is its numeric value. The state of a person is its name, birthDate, spouse and so on.

The behavior of an object is the set of functions that the object can perform. In the repository, the behavior of an object is represented by the operations defined for the owner type. A characteristic of object behavior is the ability to return some of its state to a requester. For example, the object person can return its name. For this reason, some object models describe object behavior as the set of messages that an object can receive and respond to. One example of object behavior is the capability an integer has to perform such functions as addition, square root and absolute value.

A Versionable Object is a repository object for which the version service records state changes over time. A Versioned Object is a repository object that represents a particular historical state of a versionable object.

Invention Overview

The method of the present invention includes a pair of processes that provide a generic property access operation. The first of this pair is called getProperty, which provides the capability of retrieving the value of a property of a type instance by passing the identification of the property to the operation. The second of this pair of processes is called setProperty, which provides the capability of altering the value of a property of a type instance by passing the identification of the property and the desired value for this property to the operation. The general approach in each of these processes is to:

1) Validate the request by identifying which, of an extensive set of checks, are required for the particular operation and calling checkGenericPreconditions to perform these checks; checkGenericPreconditions queries the meta data stored in the repository to make these checks; and, 2) Call the appropriate internal helper function to actually perform the task.

The approach in the internal helper functions is to:

1) Call the appropriate database interface functions to retrieve or update the value of the property and if necessary to retrieve and alter any inverse values to insure that referential integrity is maintained; and, 2) These internal helper functions may also call other internal helper functions which are already geared to perform a particular aspect of the task.

The getProperty operation returns the value of a designated property for the persistent object.

TABLE I

| Parameter | Type | Description |
|---|---|---|
| property | UrepMetaProperty | (inputOutput) Identifies the property for which the getProperty operation is to return a value. |
| RETURN: | UrepObject | Returns the value of the designated property. If the property is |
| | | An attribute, the operation returns an instance of a UrepDataType |
| | | A reference, the operation returns an instance of a UrepPersistentObject subtype. |
| | | Multivalued, the operation returns an instance of a subtype of the UrepCollection type. |
| ERRORS: | notPropertyOfType | Indicates that the designated property is not a feature defined for the persistent object. |
| | noAccessToProperty | Indicates that the designated property has an access level of no access. |
| | unknownPropertyType | Indicates that operation does not recognize the type of the designated property. |
| | unknownDataType | Indicates that the operation does not recognize the data type passed as a property value. |
| | unknownCollectionType | Indicates that the operation does not recognize the collection type of the multivalued property. |
| | unknownCardinality | Indicates that the operation cannot determine if the property is single-valued or multivalued. |
| | corruptedPropertyDb Name | Indicates that the internal name determined for the property from the repository metadata does not match the database retrieval name. |

The SetProperty operation sets the value of a designated property. If the property is a reference that has an inverse, the operation makes a corresponding change to the inverse reference.

TABLE II

| Parameter | Type | Description |
|---|---|---|
| property | UrepMetalProperty | (inputOutput) Identifies the property for which the operation is to set the value. |
| value | UrepObject | (inputOutput) Identifies the value to which the setProperty operation is to set the designated property. |
| ERRORS: | cannot ReserveObject | Indicates that the persistent object must be reserved before the setProperty can set the designated value, but the operation could not reserve the object. |

TABLE II-continued

| Parameter | Type | Description |
|---|---|---|
| | cannotUpdateReadOnly Object | Indicates that the designated property is significant and that the persistent object is read only. |
| | invalidPropertyType | Indicates that the type of the designated value is the not the type defined for the designated property. |
| | noUpDateAccessTo Property | Indicates that the designated property has an access level of read only or no access. |
| | notPropertyOfType | Indicates that the designated property is not a feature for this persistent object. |
| ERRORS: (cont.) | invalidValueType | Indicates that the type of the designated value is not valid for the property. |
| | unknownValueType | Indicates that the operation does not recognize the type of designated value. |
| | requiredPropertyWillBe Null | Indicates that the designated property is required. It cannot be set to the designated value as doing so would make the value null. |
| | valueAlreadyInDistinct Collection | Indicates that the designated value already exists in the property. The operation did not set the value as this property requires unique values. |
| | cannotRetrieveCurrent Value | Indicates that the operation could not retrieve the current value of the property. |
| | cannotRetrieveInverse Value | Indicates that the operation could not retrieve the value of the inverse reference. |
| | cannotDestruct DependentObject | Indicates that the operation could not remove a dependent object. |
| | cannotreserveObject | Indicates that the designated property is significant, but the operation could not reserve the object. |
| | beginTransaction Failure | Indicates that the operation could not begin the transaction to update the property. |
| | corruptedPropertyDb Name | Indicates that the internal name determined for the property from the repository metadata does not match the database retrieval name. |

To aid in following the various flow charts shown in the drawings and reference to the pseudo code set forth in the appendices, a hierarchy of processes described herein is set forth below. Note that some helper functions appear more than once since they are invoked from multiple places. It should be noted that some of the helper functions are only called from one place. They are not embodied in the description of the caller since the flow charts are set up as a one-to-one correspondence with the existence of separate functions in the code.

| Function Hierarchy | | |
|---|---|---|
| FIG. No | Function | Psuedo Code |
| Appendix | | |
| 3 | getProperty | A |
| 5 | getPropertyTrusted | C |
| 12A–G | checkGenericPreconditions | J |
| 6 | getAttributeTrusted | D |
| 7 | getReferenceTrusted | E |
| 4 | setProperty | B |
| 12A–G | checkGenericPreconditions | J |
| 8 | setPropertyInternal | F |
| 9A–D | setProperty_Persistent | G |

| FIG. No | Function | Psuedo Code |
|---|---|---|
| 7 | getReferenceTrusted | E |
| 13 | reserveForSignificant | K |
| 8 | setPropertyInternal | F |
| 11A–F | setProperty_Collection | I |
| 7 | getReferenceTrusted | E |
| 13 | reserveForSignificant | K |
| 8 | setPropertyInternal | F |
| 10A AND B | setProperty_DataType | H |
| 6 | getAttributeTrusted | D |

Figure 2:
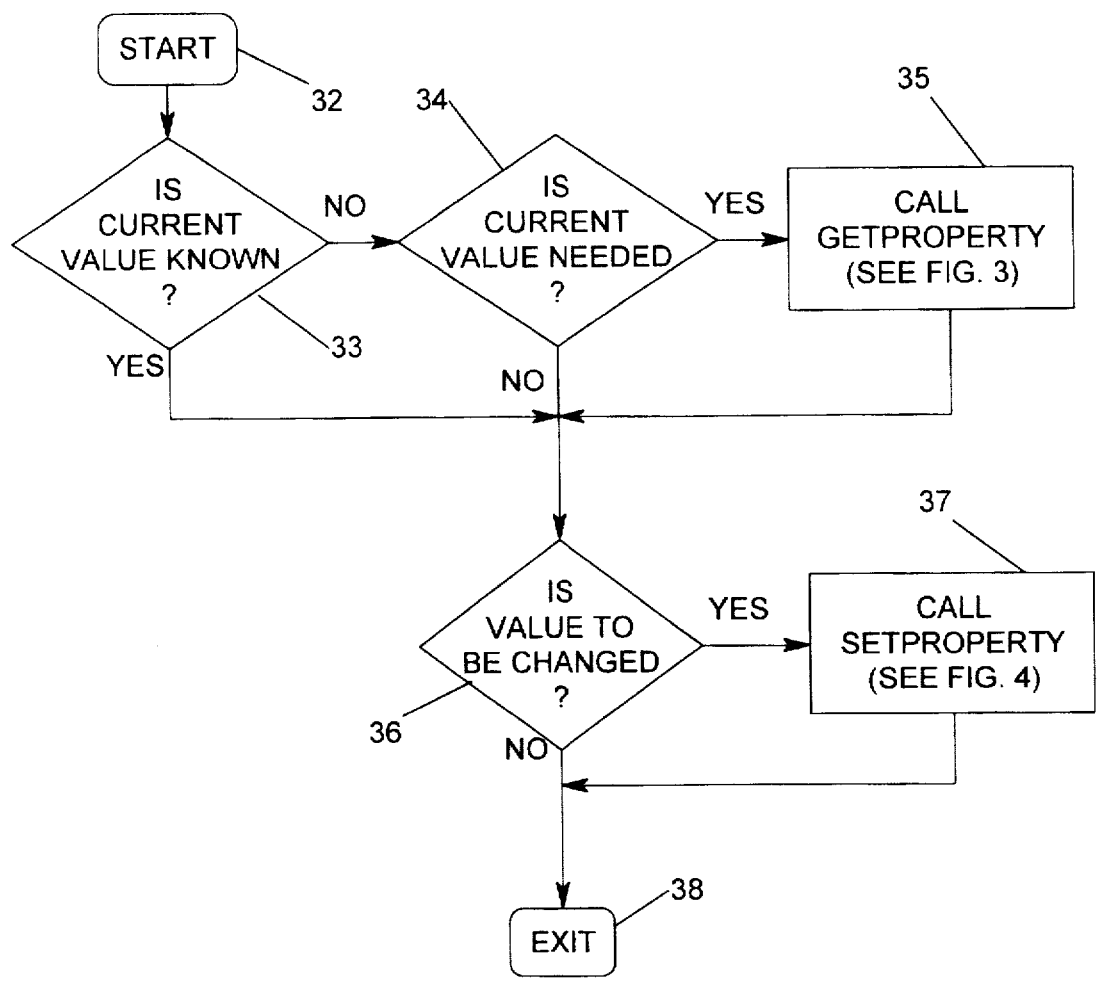
FIG. 2 is a flow chart illustrating the steps of the overall process for manipulating properties of objects in a repository.
Figure 3:
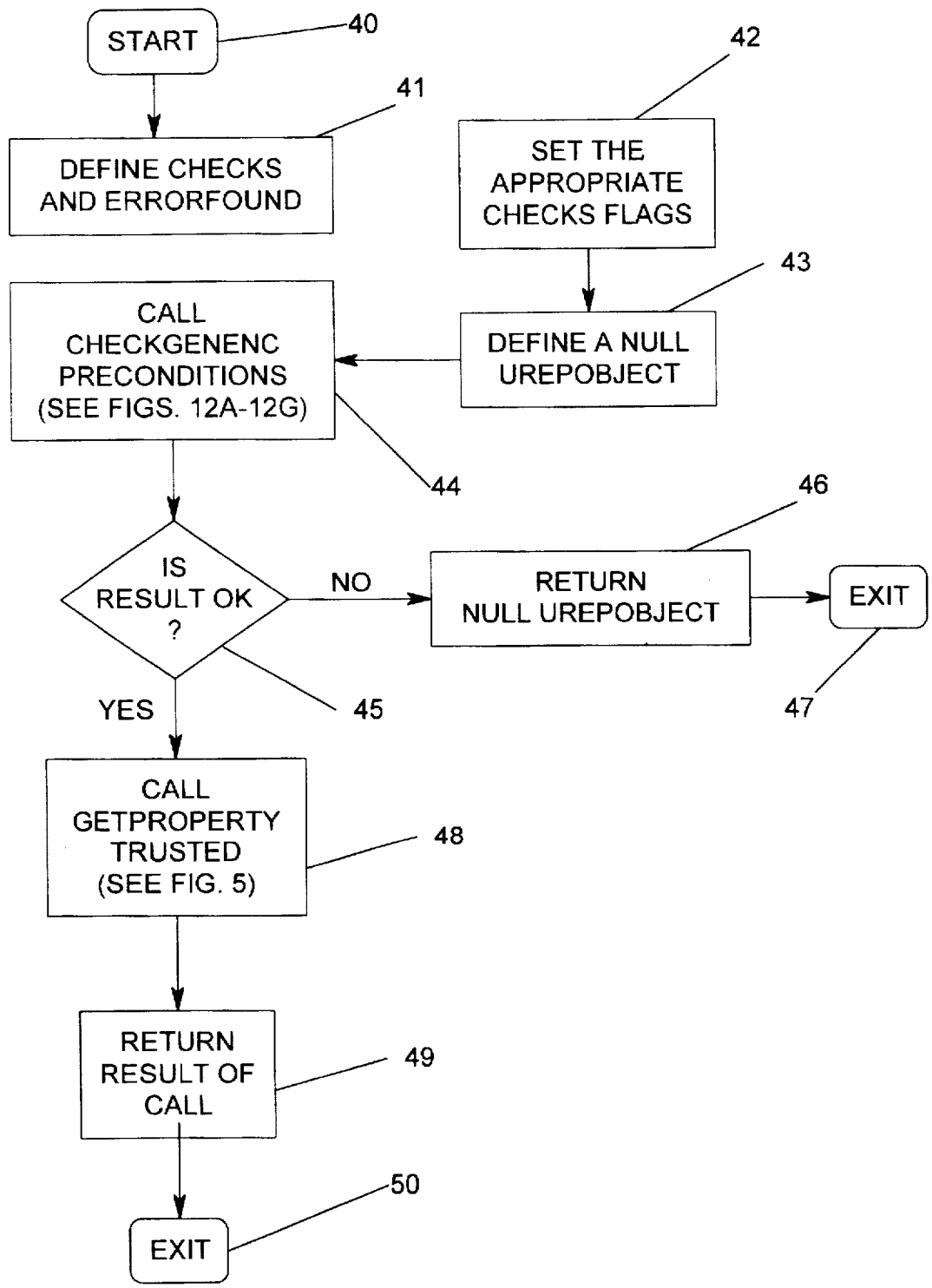
FIG. 3 is a flow chart illustrating the steps of the process for getting a property (i.e., getProperty).

At this juncture of the description it is pointed out that reference numbers 23–31 were intentionally omitted. Referring now to FIG. 2, a flow chart illustrating a process for generically manipulating properties of objects stored in the repository is shown. The process begins with a start bubble 32 followed by an inquiry as to whether or not the current value of a particular property is known (diamond 33). If the answer to this inquiry is no, then another inquiry is made as to whether or not the current value is needed (diamond 34). If the answer to this inquiry is yes then a process step (block 35) is performed of calling a process sequence identified herein as getProperty, which is illustrated in FIG. 3 and described further hereinafter. On the other hand, if the answer to the first inquiry (diamond 33) is yes, or the answer to the second inquiry (diamond 34) is no, or upon completion of the CALL getProperty step (block 35), then yet another inquiry is made as to whether or not the value of the particular property is to be changed (diamond 36).

Figure 4:
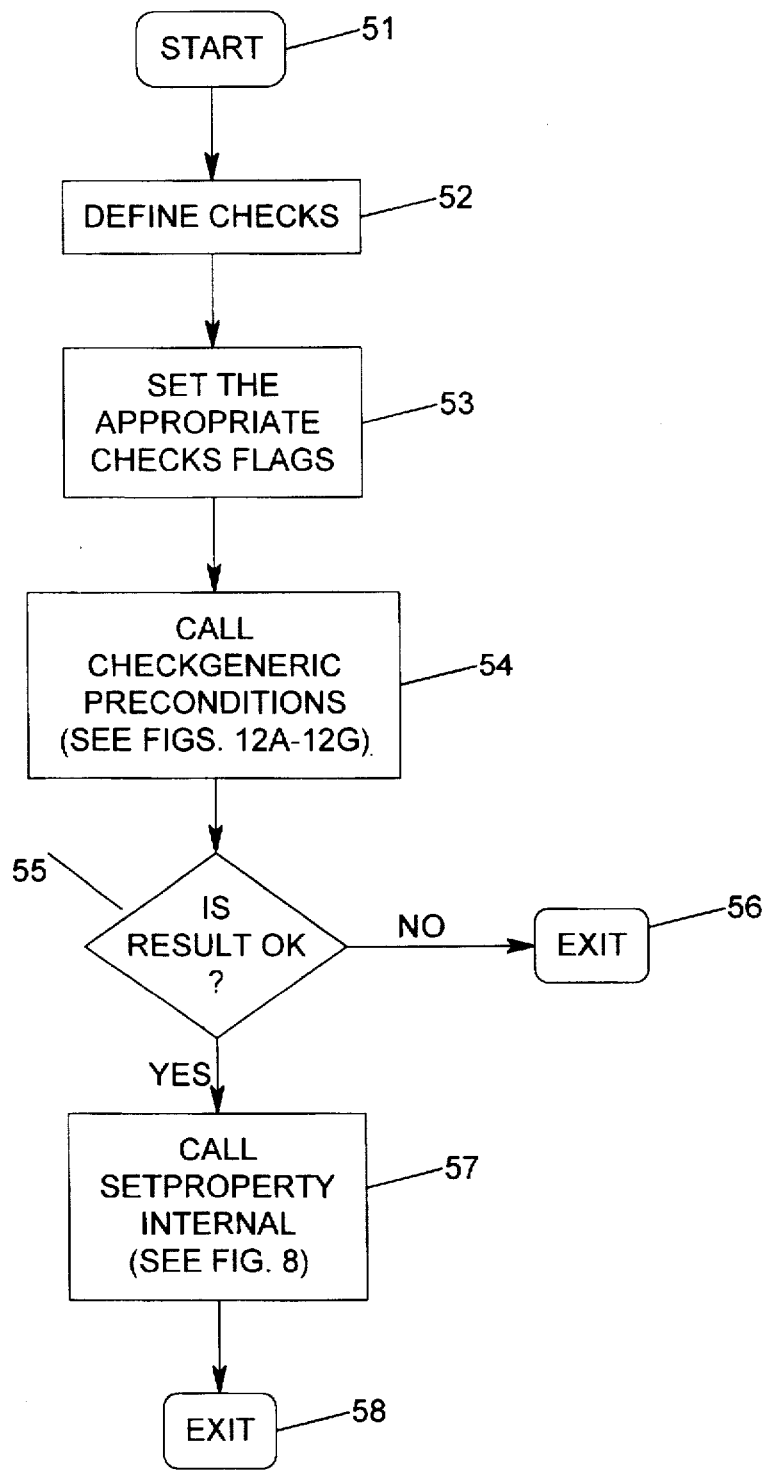
FIG. 4 is a flow chart illustrating the steps of the process for setting a property (i.e., setProperty).

If the value of the particular property is to be changed then a process step (block 37) is performed calling a process sequence identified herein as setProperty, which is illustrated in FIG. 4 and described further hereinafter. On the other hand, if the value of the particular property is not to be changed, or following the calling of the setProperty process, the current process sequence is exited (bubble 38).

Referring now to FIG. 3, a flow chart is shown of the process for getting a property, which is also referred to herein as getProperty. The process begins with a start bubble 40 followed by a step of defining an error flag and a checks integer (block 41). Next a step of setting the checks value for the operation is performed (block 42), followed by a step of defining a null UrepObject (block 43). Another process sequence called checkGenericPreconditions, set forth in FIGS. 12a–12d and described further hereinafter, is called to validate the input (block 44). An inquiry is next made to determine if the result is ok, decision diamond 45. If the validation is not satisfactory, the null UrepObject is returned (block 46), and the process is exited (bubble 47). On the other hand if the validation is satisfactory, then another process sequence getPropertyTrusted (set forth in FIG. 5 and described further hereinafter) is called to retrieve the property value (block 48). The results of this call is returned (block 49) and the process is exited (bubble 50).

Referring now to FIG. 4, a flow chart illustrates the process for setting a property. The process begins with a start bubble 51, followed by a step of defining a checks integer (block 52). Next, the appropriate flags are set (block 53), which sets the checks value for the operation. The checkGenericPreconditions process sequence (set forth in FIGS. 12a–12d and described further hereinafter) is called to validate the input (block 54). An inquiry is made to determine if the result is OK (decision diamond 55). If the validation is not satisfactory, the process is exited (bubble 56). On the other hand if the validation is satisfactory a process sequence setPropertyInternal, which is set forth in FIG. 8 and to be described further hereinafter, is called to set the property value (block 57). After this step the process is exited (bubble 58).

Figure 5:
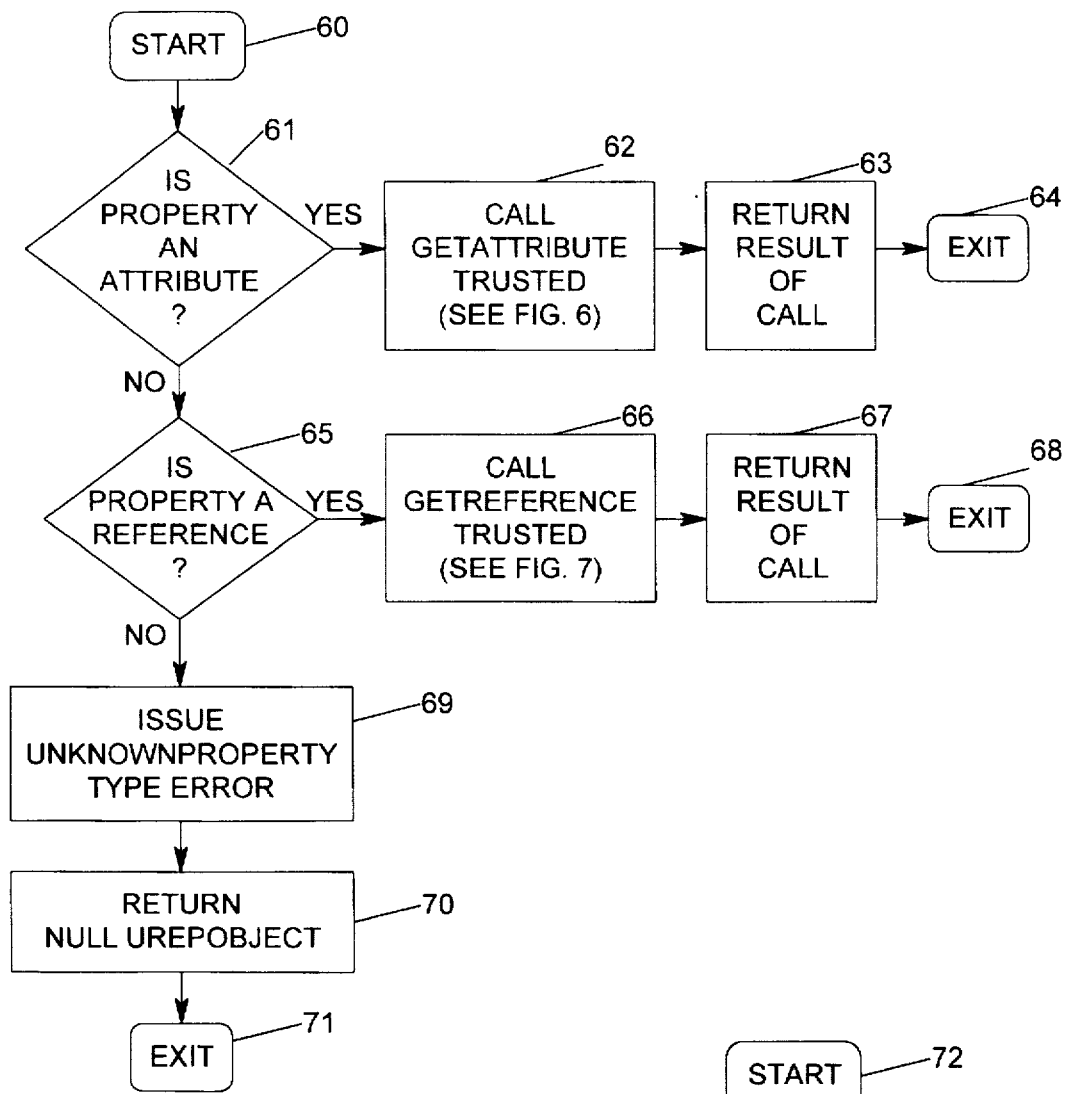
FIG. 5 is a flow chart illustrating the steps of the process for getting a property in a trusted manner (i.e., getPropertyTrusted).

Referring now to FIG. 5, a flow chart illustrates the getPropertyTrusted process sequence. The process begins with a start bubble 60, followed by an inquiry to determine if the property is an attribute (decision diamond 61). If the property is an attribute, then a process sequence getAttributeTrusted (set forth in FIG. 6 and described further hereafter) is called to retrieve the property value (block 62). The result of calling this process sequence is returned (block 63), and this process is exited (bubble 64). Returning to the decision diamond 61, if the property is not an attribute, then another inquiry is made as to whether or not the property is a reference (diamond 65). If the property is a reference, then a getReferenceTrusted process sequence (set forth in FIG. 7 and described further hereinafter) is called (block 66). The result of calling this process sequence is returned (block 67) and the process is exited (bubble 68).

Returning to the decision diamond 65, if the property is not a reference, then an unknown property type error is issued (block 69). Next, a null UrepObject is returned (block 70), and process is exited (bubble 71).

Figure 6:
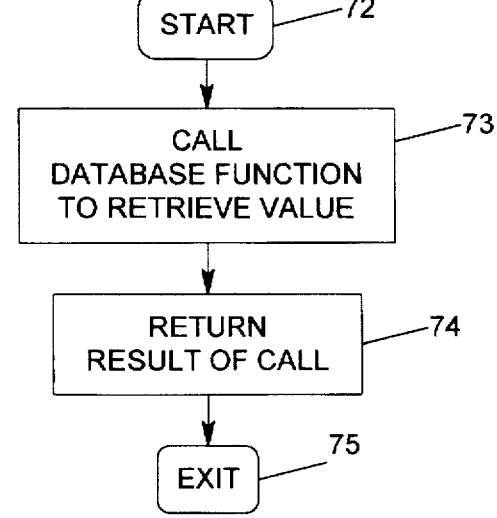
FIG. 6 is a flow chart illustrating the steps of the process for getting an attribute in a trusted manner (i.e., getAttributeTrusted).

Referring now to FIG. 6, a flow chart illustrates the getAttributeTrusted process sequence. After entering the process (start bubble 72), the database interface function is called to retrieve the value of the attribute (block 73). Next, the result of the call is returned (block 74) and the process sequence is exited (bubble 75).

Figure 7:
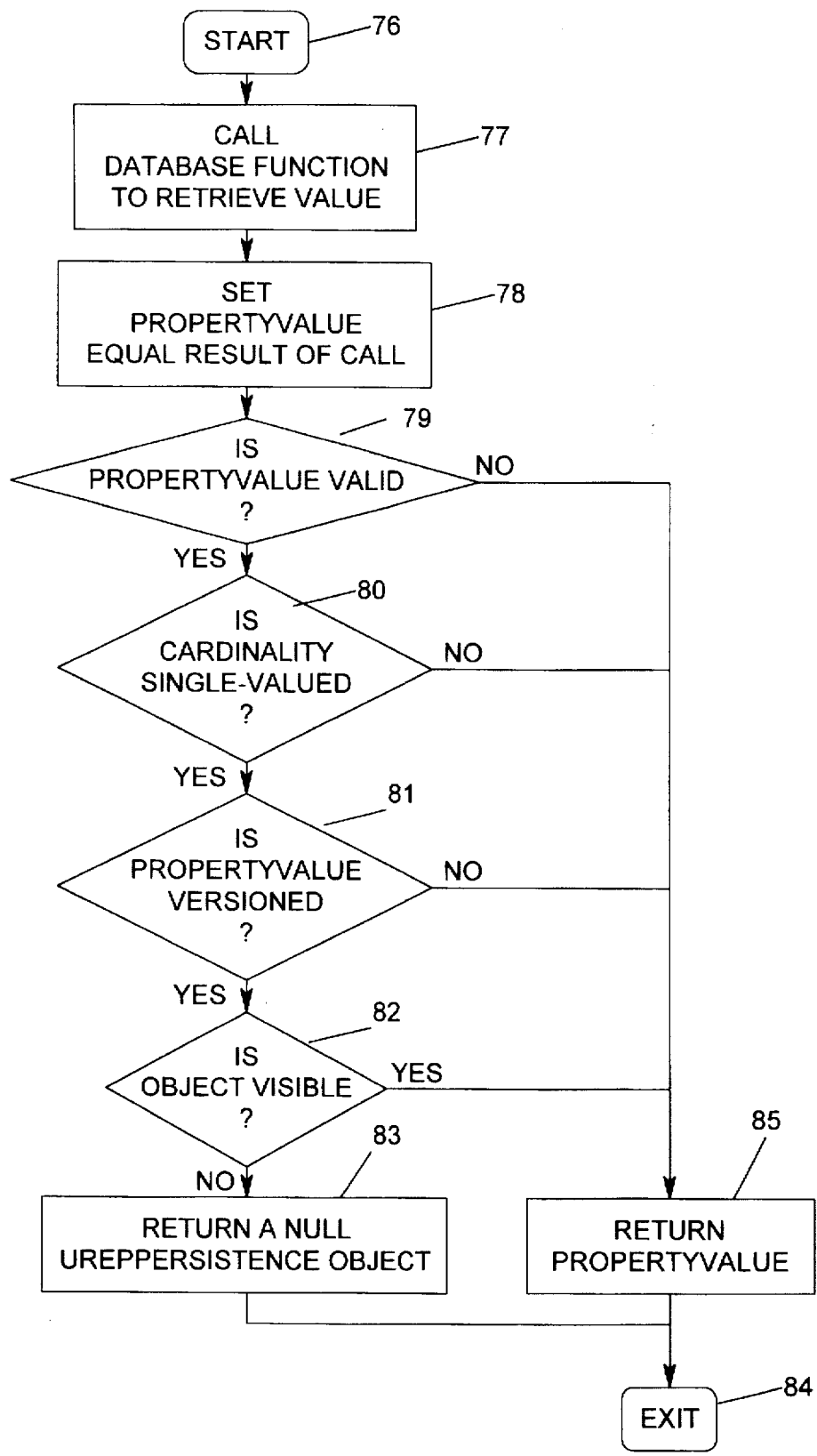
FIG. 7 is a flow chart illustrating the steps of the process for getting a reference in a trusted manner (i.e., getReferenceTrusted).

Referring now to FIG. 7, a flow chart illustrates the getReference process sequence. The process begins with a start bubble 76, followed by a step of calling the database interface function to retrieve the value of the reference (block 77). Next, a local variable propertyValue is set equal to the result of the call (block 78). An inquiry is made as to whether propertyValue is valid (diamond 79). If the propertyValue is valid, then another inquiry is made as to whether or not the cardinality is single-valued (diamond 80). If it is single-valued, yet another inquiry is made as to whether or not propertyValue is versioned (diamond 81). If it is versioned still another inquiry is made as to whether or not the object is visible (diamond 82). If calling verifyVisibility returns FALSE (i.e., the object is not visible), then a null UrepPersistentObject is returned (block 83) and the process is exited (bubble 84).

On the other hand, if propertyValue is not valid, cardinality is not single-valued, propertyValue is not versioned but the object is visible then propertyValue is returned (block 85) and the process is exited.

Figure 8:
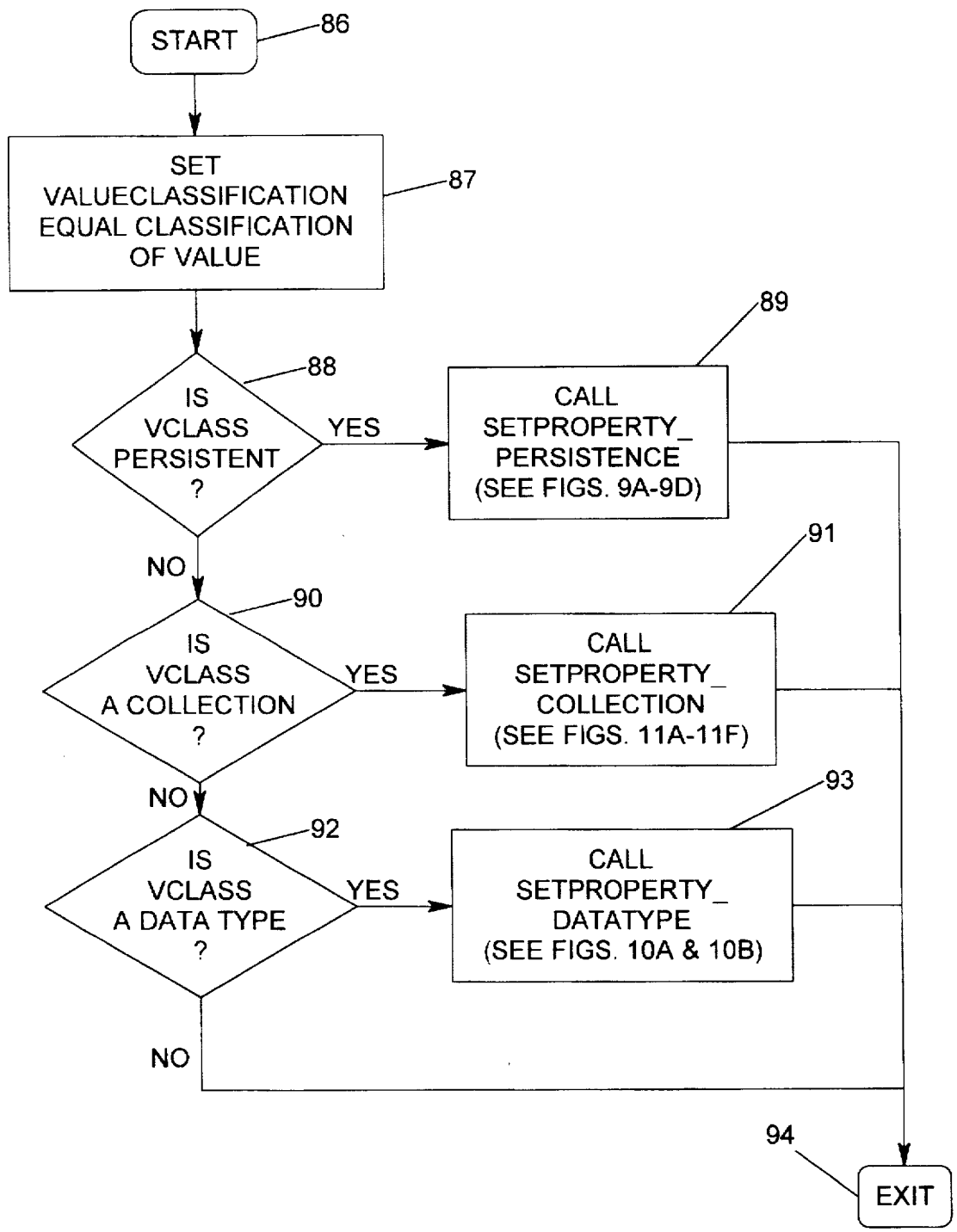
FIG. 8 is a flow chart illustrating the steps of the process for setting a property internally (i.e., setPropertyInternal).

Referring now to FIG. 8, a flow chart illustrates setting a property internally. The process sequence begins with a start bubble 86 followed by a process step of setting a local variable valueClassification equal to the classification of value (block 87). Next an inquiry is made as to whether or not valueClassification is a PersistentObject (diamond 88). If the answer to this inquiry is yes, then a process sequence setProperty_Persistent (which is set forth in FIGS. 9a–9c and to be described further hereinafter) is called to set the value of the property (block 89). On the other hand, if valueClassification is not a PersistentObject, then another inquiry is made as to whether or not valueClassification is a UrepCollection (diamond 90). If the answer to this inquiry is yes, then another process sequence setProperty_Collection (set forth in FIGS. 11a–11c and described further hereinafter) is called to set the value of the property (block 91).

Returning to the decision diamond 90, if the valueClassification is not a UrepCollection, then yet another inquiry is made as to whether or not valueClassification is a DataType (diamond 92). If the answer to this inquiry is yes, then a process sequence setProperty_DataType (set forth in FIG. 10 and described further hereinafter) is called to set the value of the property (block 93). On the other hand, if valueClassification is not a DataType, the process is exited (bubble 94).

Figure 9A:
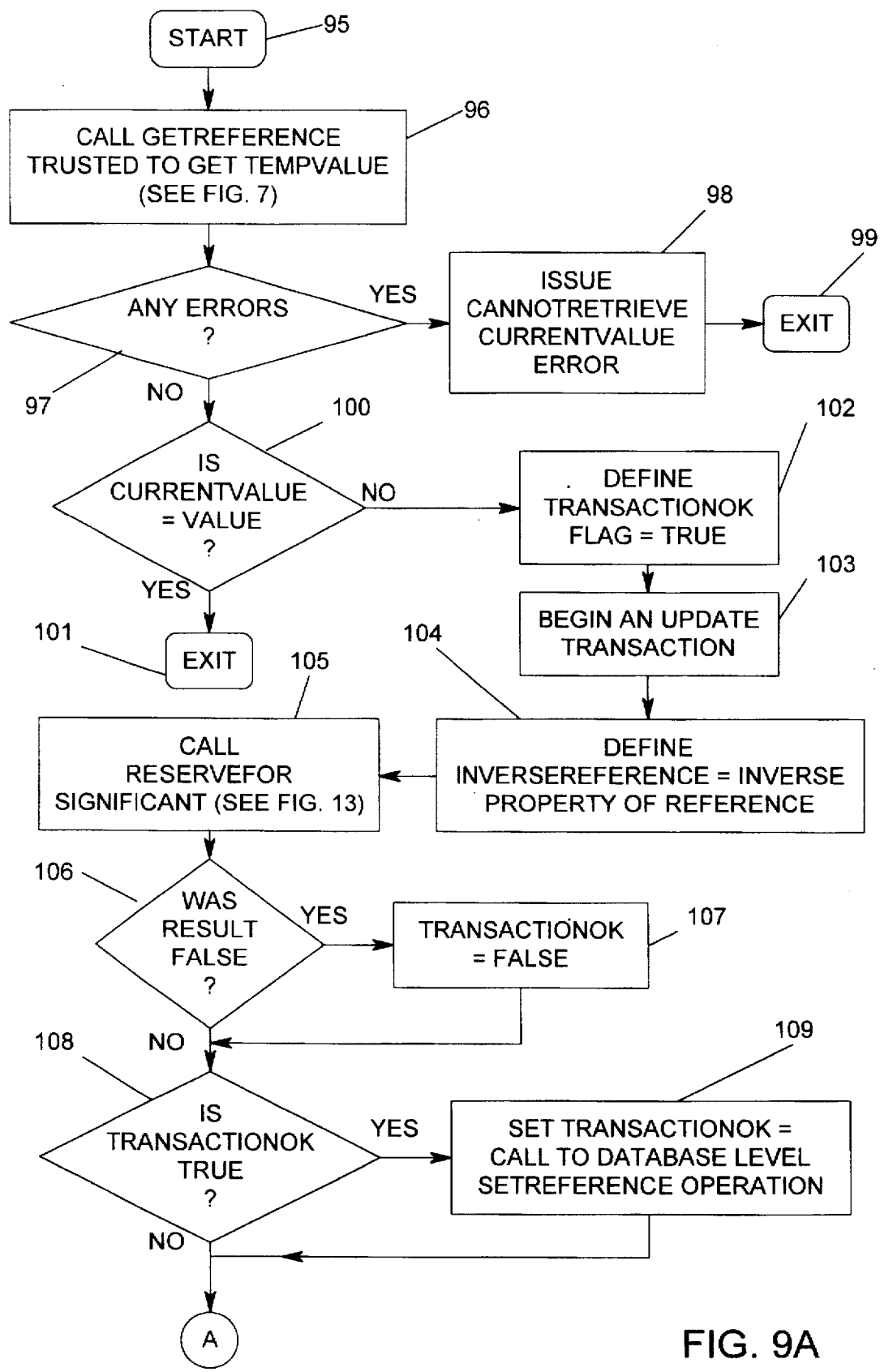
Figure 9C:
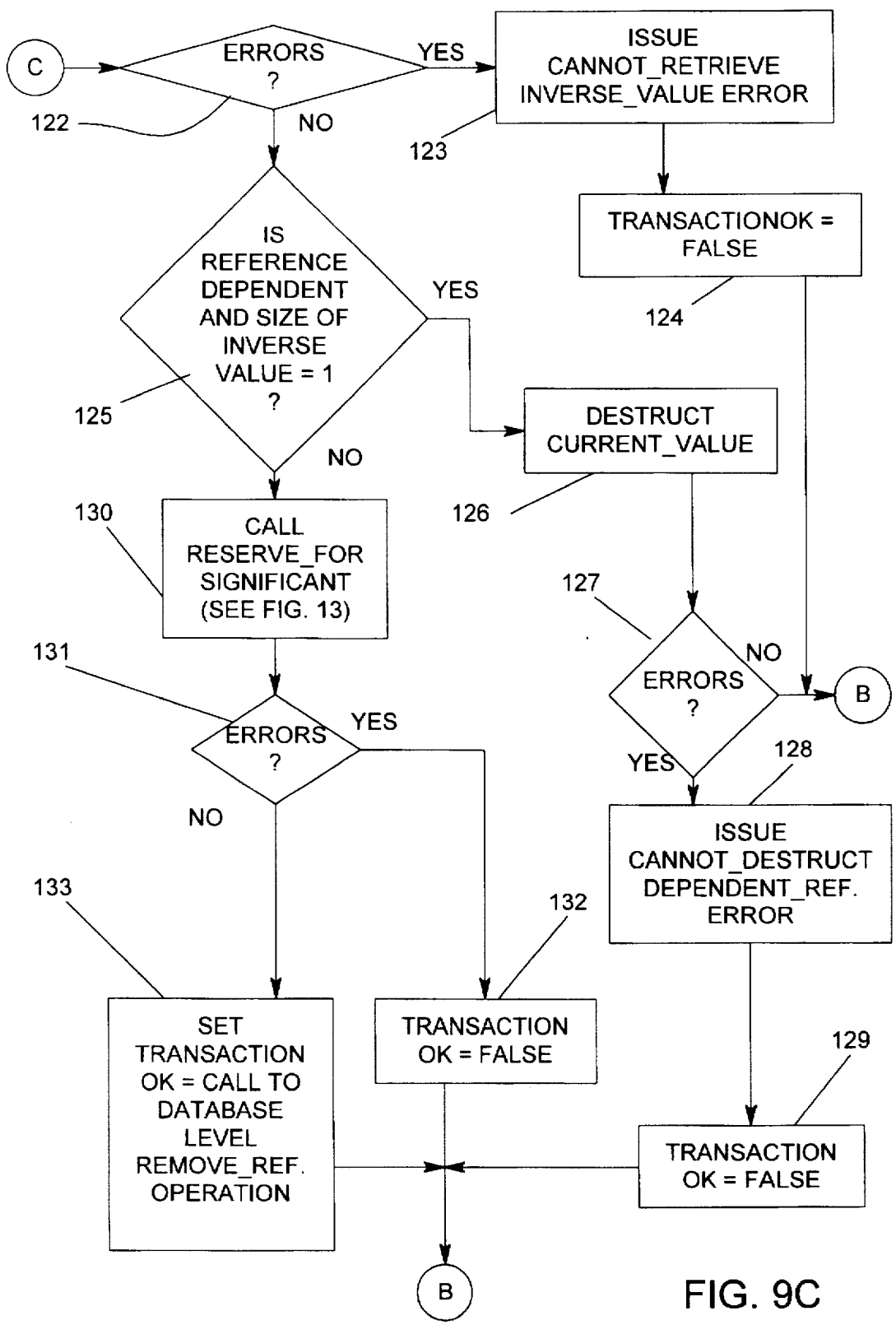

Referring now to FIG. 9A, a flow chart illustrates the setting of a property which is a persistent object (i.e., setProperty_PersistentObject). The process begins with a start bubble 95 followed by the calling of a process sequence getReferenceTrusted (illustrated in FIG. 7) to get the current value of the property, tempValue (block 96). Next, an inquiry is made as to whether or not there were any errors (diamond 97). If there were errors an error message, cannotRetrieveCurrentValue, is issued (block 98), and the process is exited (bubble 99). On the other hand, if there were no errors then another inquiry is made as to whether or not value is the same as currentValue (decision diamond 100). If the answer to this inquiry is yes, then the process is exited (bubble 101).

On the other hand, if value is not equal to currentValue, then an OK flag is set (i.e., a transactionOK flag is set equal to TRUE) as depicted by a process block 102. An update transaction is begun (block 103), followed by a process step of defining a local UrepMetaReference, inverseReference, which is the inverse of the reference property (block 104). After this, a process sequence-reserveForSignificant- (illustrated in FIG. 13 and described further hereafter) is called (block 105), followed by an inquiry as to whether or not the result was FALSE (diamond 106). If the answer is yes, then transactionOK is set equal to FALSE (block 107). On the other hand, if the result was TRUE, then another inquiry is made as to whether or not transactionOK is TRUE (diamond 108). If the answer is yes, then transactionOK is set equal to the result of calling the database interface function to set the value of the reference (block 109). On the other hand, if the answer is no then the process step depicted by block 109 is skipped and a branch is made to the next sheet of drawings as depicted by a connector A.

Referring now to FIG. 9B, a continuation of the setProperty_PersistentObject process sequence is shown. From the connector A, an inquiry is made as to whether or not transactionOK is TRUE and inverseReference and currentValue are valid (diamond 110). If the answer to this inquiry is yes, then another inquiry is made as to whether or not inverseReference is single-valued (diamond 111). If yes, then yet another inquiry is made as to whether or not reference is dependent (diamond 112). If the reference is dependent, then currentValue is destructed (block 113). Next, another inquiry is made as to whether or not there were any errors (diamond 114). If no errors were found then a branch is taken to FIG. 9D as denoted by a connector B (at the no leg of the diamond 114).

On the other hand, if there were errors (yes leg of diamond 114), then a cannotDestructDependentReference error message is issued (block 115). Next, transactionOK is set equal to FALSE (block 116) and a branch is taken to FIG. 9D as denoted by a connector B. Returning to the no leg of the diamond 112 (i.e., reference is not dependent), a process sequence reserveForSignificant (illustrated in FIG. 13 and described hereinafter) is called (block 117). After this, an inquiry is made as to whether or not there were any errors (diamond 118). If there were no errors, then the database interface function is called to set the value in the database (block 119). On the other hand, if there were errors then transactionOK is set equal to FALSE (block 120). Following completion of the steps depicted by blocks 119 and 120 a branch is taken to FIG. 9D as denoted by a connector B.

Returning to the decision diamond 111, if inverseReference is not single-valued then a process sequence getReferenceTrusted (illustrated in FIG. 7) is called to get the current value (block 121). A branch is taken to FIG. 9C, as denoted by a connector C wherein, an inquiry is made as to whether or not there were any errors (diamond 122). If there were errors then a cannotRetrieveCurrentValue error is issued (block 123). After this, transactionOK is set equal to FALSE (block 124). On the other hand, if there were no errors another inquiry is made as to whether or not reference is dependent and the size of the inverse value is one (1) (diamond 125). If the answer to this inquiry is yes, then currentValue is destructed (block 126). Yet another inquiry is made as to whether or not there were any destruct errors (diamond 127). If the answer to this inquiry is yes, then a cannotDestructDependentReference error is issued (block 128). Next, transactionOK is set to FALSE (block 129). On the other hand, if there were no errors, a branch is taken to FIG. 9D as denoted by a connector B.

Figure 9D:
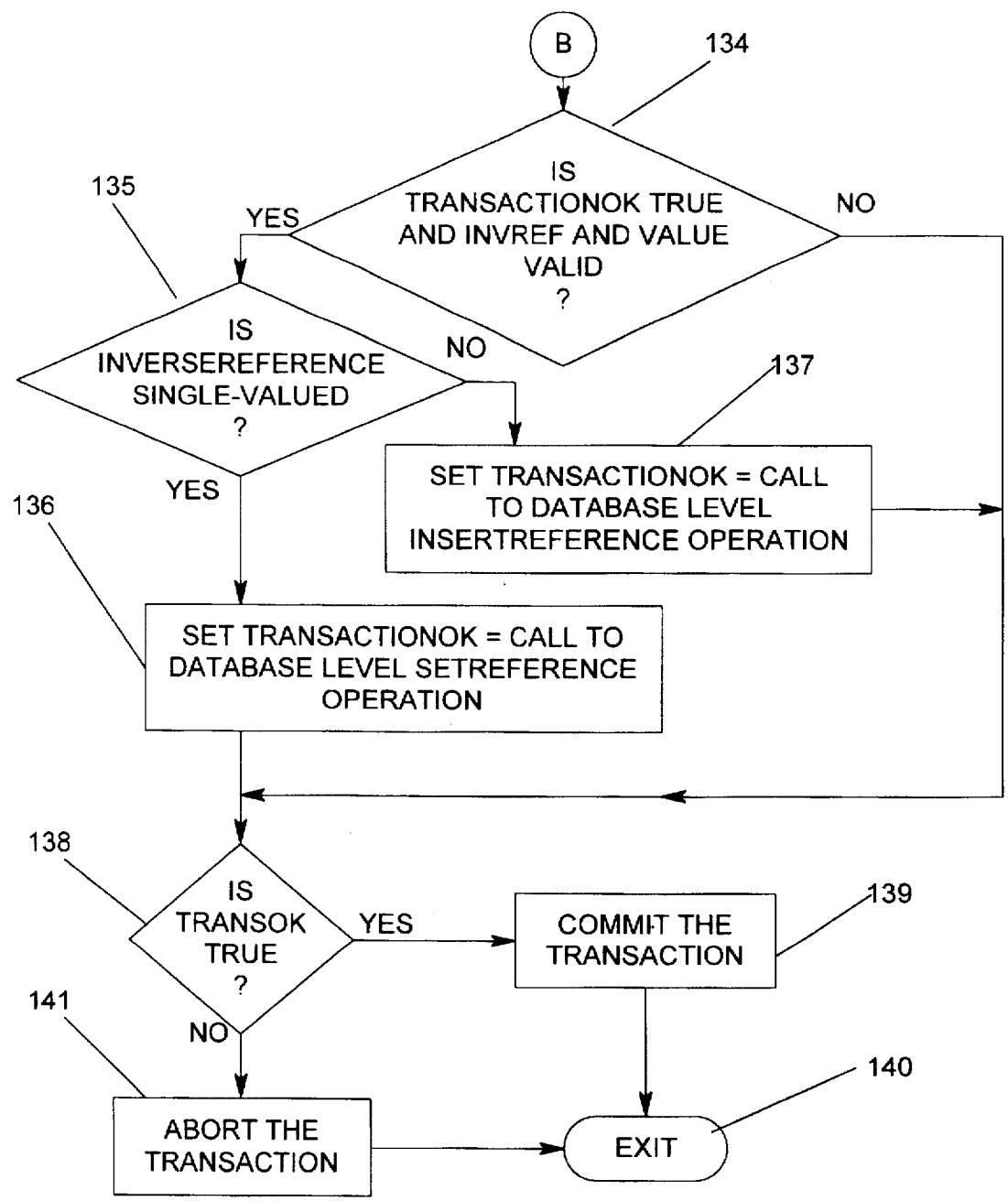

If the answer to the inquiry in decision diamond 125 is no, then a process sequence reserveForSignificant (set forth in FIG. 13 and described further hereafter) is called (block 130). Next, another inquiry is made as to whether or not there are any errors (diamond 131). If the answer is yes, then transactionOK is set equal to FALSE (block 132) and a branch is taken to FIG. 9D as denoted by a connector B. On the other hand, if there were no errors then transactionOK is set equal to the result of calling the database interface function to remove the target object from the inverse (block 133). Reference is now made to FIG. 9D, at the connector B, completion of the setProperty_PersistentObject process.

An inquiry is made as to whether or not transactionOK is TRUE, inverseReference is valid and value is valid (diamond 134). If the answer to this inquiry is yes, then another inquiry is made as to whether or not inverseReference is single-valued (diamond 135). If inverseReference is single-valued then transactionOK is set equal to the result of calling the database level setReference operation (block 136). Otherwise, if it is not single-valued then transactionOK is set equal to the result of calling the database interface function to insert the target object in the inverse (block 137).

If the answer to the inquiry in diamond 134 is no or once the process step depicted by the block 137 is complete, an inquiry is made as to whether or not transactionOK is TRUE (diamond 138). If the answer to this inquiry is yes then the transaction is committed (block 139) followed by an exit of the process (bubble 140). On the other hand, if transactionOK is not TRUE, then the transaction is aborted (block 141) followed by an exit of the process.

Figure 10A:
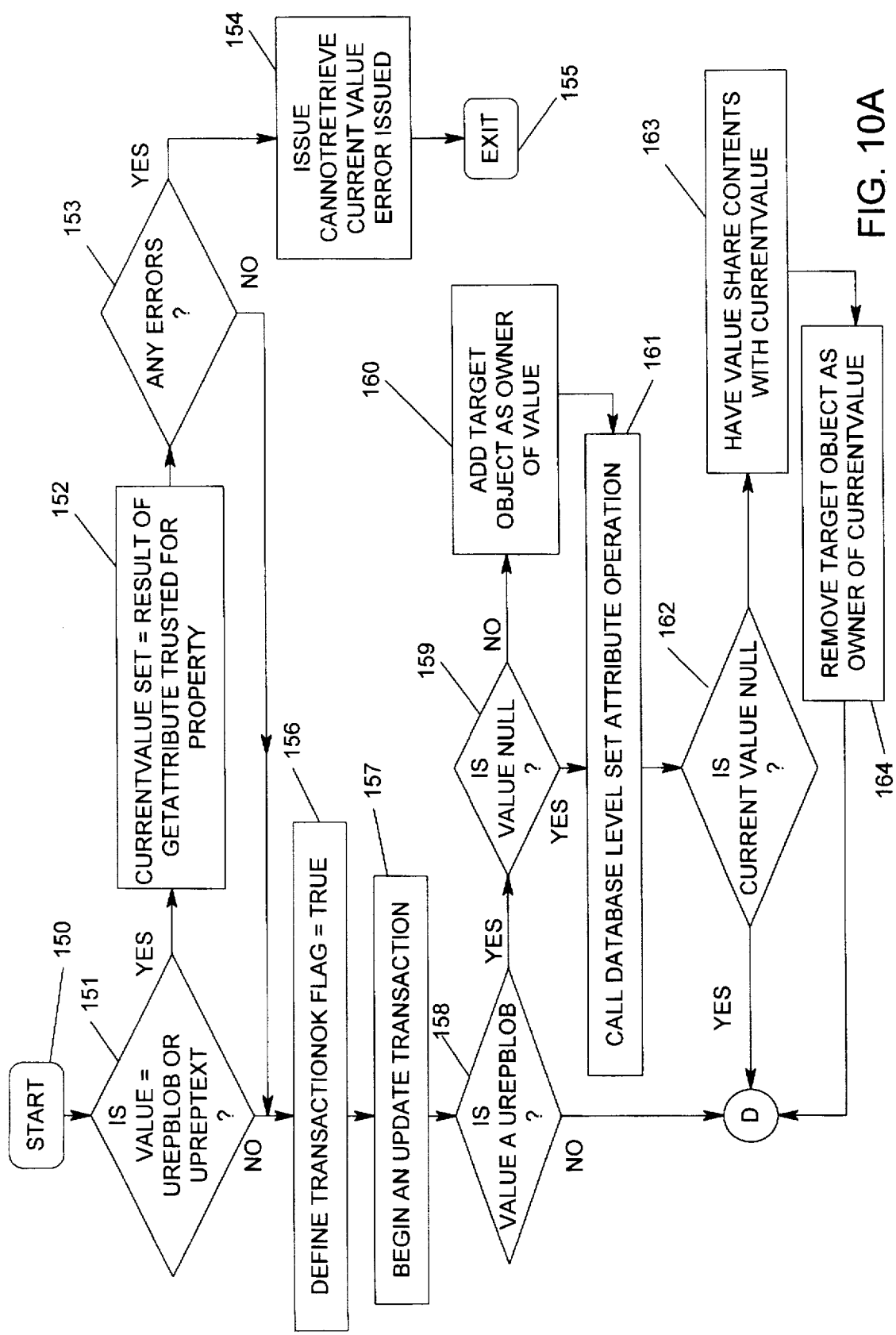
FIGS. 10A and 10B combined form a flow chart illustrating the steps of the process for setting a property which is a data type (i.e., setProperty_DataType).

Referring now to FIG. 10A, the first part of a two-sheet flow chart illustrates the setProperty_DataType process. The process begins with a start bubble 150, followed by an inquiry as to whether or not value is a UrepBlob or a UrepText (diamond 151). If the answer to this inquiry is yes then a local variable currentValue is set equal to the result of calling the process sequence getAttributTrusted for the property (block 152). Next, another inquiry is made as to whether or not there are any errors (diamond 153). If there are errors in this call, then a cannotRetrieveCurrentValue error is issued (block 154) followed by an exit from the process (bubble 155).

Returning to the diamond 151, if the answer is no then a local transactionOK flag is defined as TRUE (block 156).

Next, an update transaction is begun (block 157). After this, another inquiry is made as to whether or not value is a UrepBlob (diamond 158). If the answer to this inquiry is yes, then yet another inquiry is made as to whether or not value is null (diamond 159), and if it is not null then the target object is added as an owner of value (block 160). On the other hand, if value is null (or after step 160) then the database interface is called to set the value of the attribute (block 161). An inquiry is next made as to whether or not currentValue is null (diamond 162), and if it is not null then content sharing is set up between currentValue and value (block 163). Next, the target object is removed as an owner of currentValue (block 164).

Figure 10B:
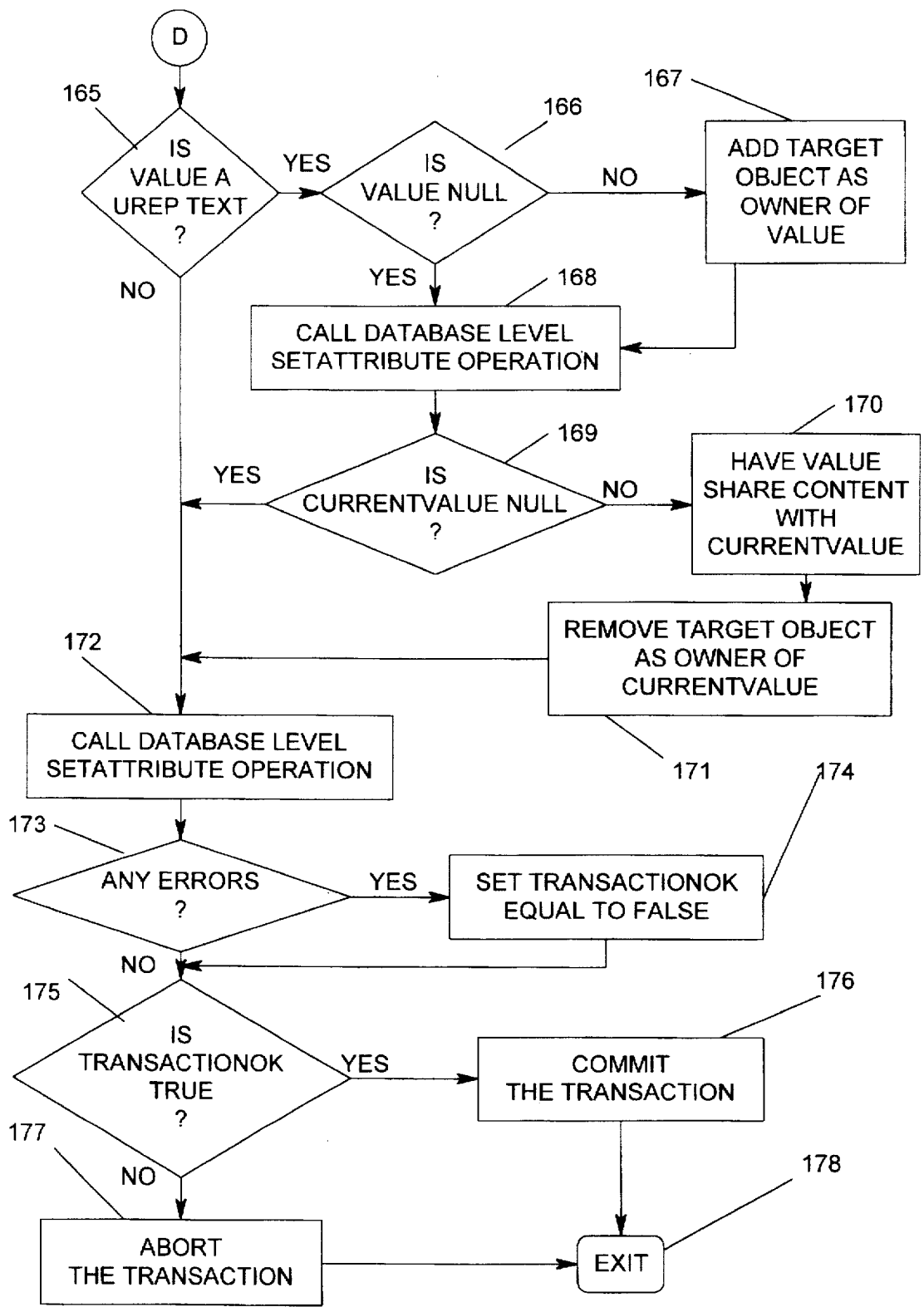

Following, this, or if the answer to the inquiry in the diamond 158 is no, then a branch is taken to FIG. 10B as denoted by a connector D. Referring now to FIG. 10B, at the connector D, an inquiry is made as to whether or not value is a UrepText (diamond 165). If the answer to this inquiry is yes then another inquiry is made as to whether or not value is null (diamond 166), and if it is not null a process step of adding the target object as an owner of value is performed (block 167). Once this step is performed, or if value is null, another process step of calling the database interface function to set the value of the attribute is performed (block 168). Next, an inquiry is again made as to whether or not currentValue is null (diamond 169), and if no then content sharing is set up between currentValue and value (block 170). After this, a process step of removing the target object as an owner of currentValue is performed (block 171).

Returning to the decision diamond 165, if value is not a UrepText or currentValue is null or on completion of the step 171, the database interface function is called to set the value of the attribute (block 172). Next, an inquiry is made as to whether or not there were any errors (diamond 173). If there were errors, then transactionOK is set equal to FALSE (block 174). On the other hand if there were no errors then another inquiry is made as to whether or not transactionOK is TRUE (diamond 175), and if yes then the transaction is committed (block 176) and the process is excited. On the other hand if transactionOK is not TRUE then the transaction is aborted (block 177) and the process is exited (bubble 178).

Figure 11A:
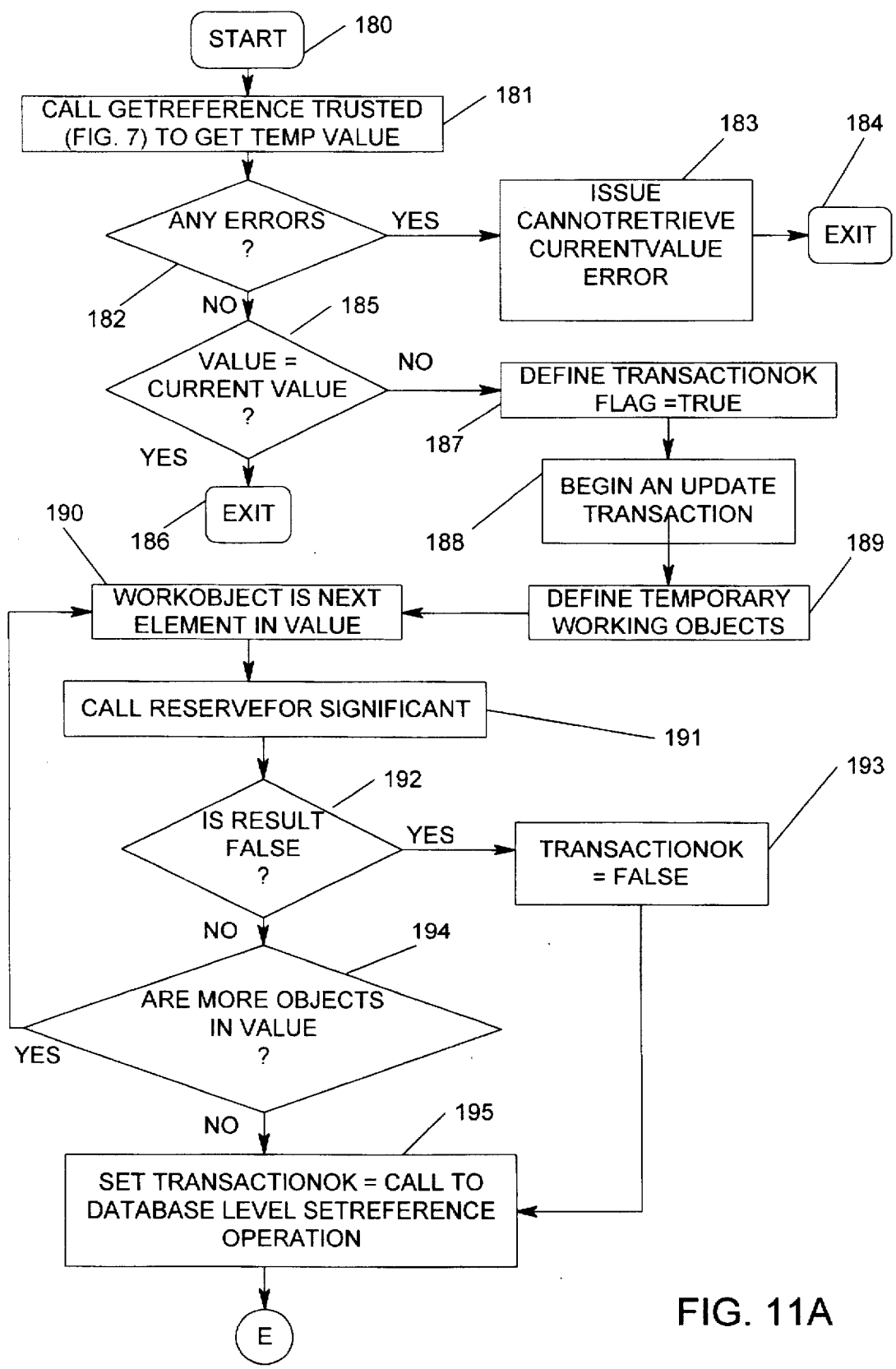
FIGS. 11A through 11F combined form a flow chart illustrating the steps of the process for setting a property which is a collection (i.e., setProperty_Collection).
Figure 11B:
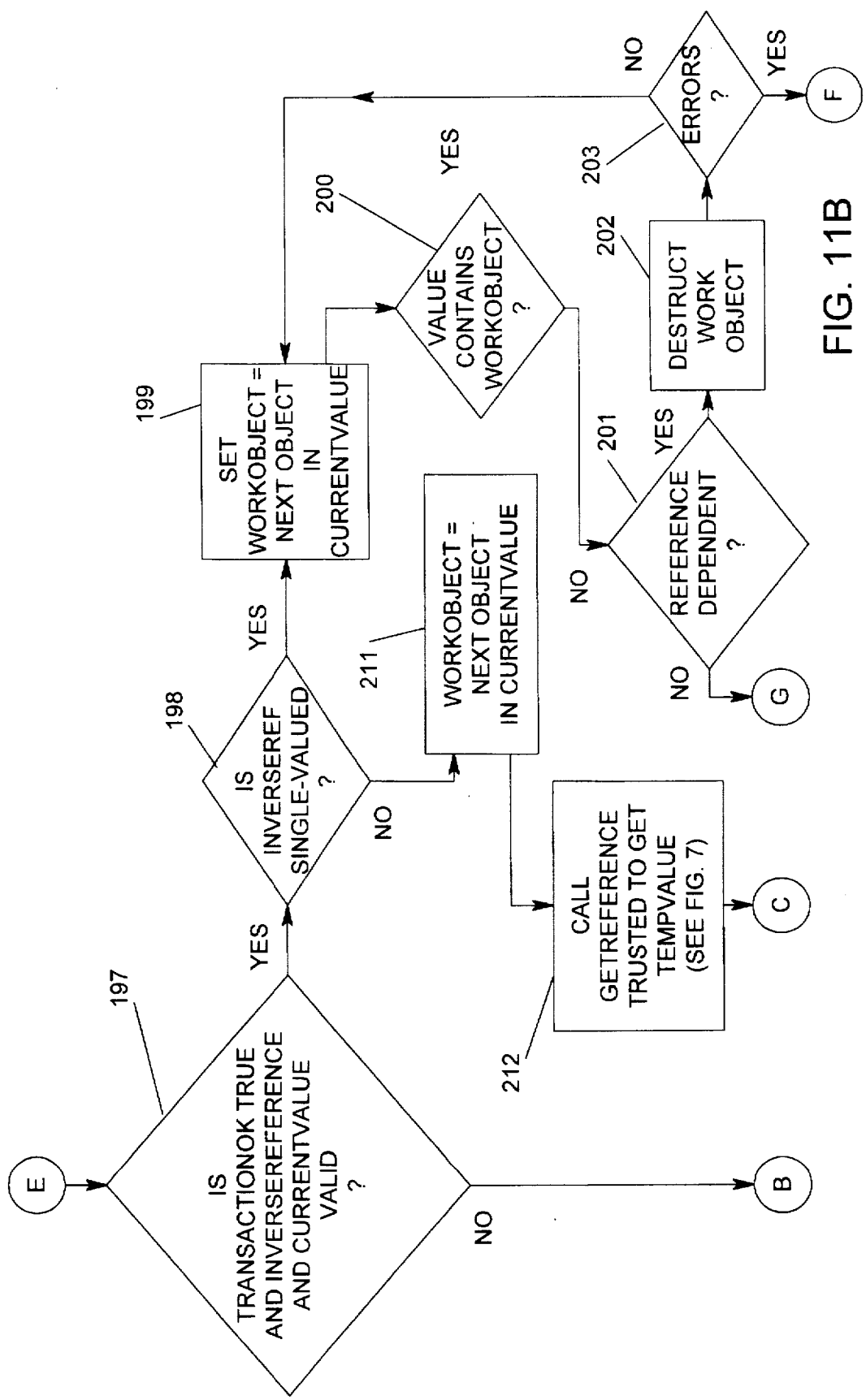

Referring now to FIG. 11A, which is the first of a six-sheet flow chart that illustrates the beginning of the process sequence setProperty_Collection. The process begins with a start bubble 180, followed by a process step of calling getReferenceTrusted process (illustrated in FIG. 7) to get tempValue, which is the current value of the property (block 181). Next, an inquiry is made as to whether or not there were any errors (diamond 182). If there were errors, then a cannotRetrieveCurrentValue error is issued (block 183), and the process is exited (bubble 184). On the other hand, if there were no errors another inquiry is made as to whether or not value is the same as currentValue (diamond 185). If the answer to this inquiry is yes then the process is exited (bubble 186).

On the other hand, if value is not the same as currentValue a process step of defining a transactionOK flag equal to TRUE is performed (block 187). Next, a transaction update is begun (block 188) followed by a process step of defining a set of local working objects (block 189). After this, another process step of setting workObject equal to the next object in value is performed (block 190). Next, the process sequence reserveForSignificant (illustrated in FIG. 13 and described further hereinafter) is called (block 191). At this time an inquiry is made as to whether or not this call returned FALSE (diamond 192). If the answer is yes, then transac-tionOK is set to FALSE (block 193). On the other hand, if the answer is no, then yet another inquiry is made as to whether or not there are more objects in value (diamond 194). If the answer is yes, then a return is made back to the block 190 to process the next object. On the other hand, if there are no more objects in value, then transactionOK is set equal to the result of calling the database interface function to set the value of the reference (block 195). The process is continued on the next sheet in FIG. 11B as denoted by a connector E.

Referring now to FIG. 11A, at the connector E, an inquiry is made as to whether or not transactionOK is TRUE, inverseReference is valid and currentValue is valid (diamond 197). If the answer to this inquiry is yes, then another inquiry is made as to whether or not inverseReference is single-valued (diamond 198). If inverseReference is single-valued, then workObject is set equal to the next object in currentValue (block 199). Yet another inquiry is made as to whether or not value already contains workObject (diamond 200), and if so returning to the block 199. On the other hand, if value does not contain workObject still another inquiry is made as to whether or not reference is dependent (diamond 201). If the answer to this inquiry is yes, then workObject is destructed (block 202), followed by another inquiry as to whether or not there were any errors (diamond 203). If there were no errors, then a return is made back to the process block 199.

Figure 11C:
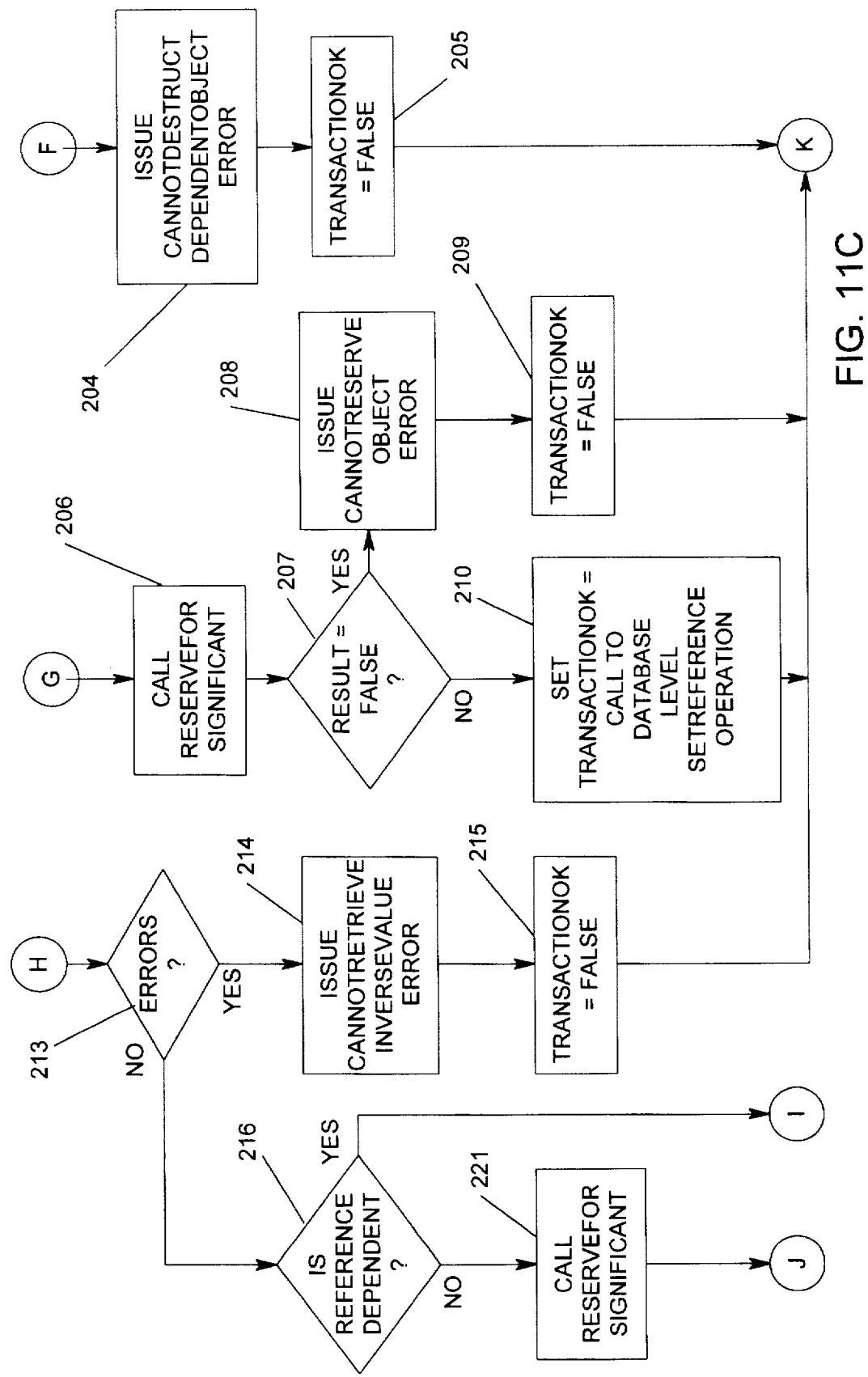

With reference to FIG. 11C at the connector F (where there were errors in the destruct), then a cannotDestructDependentReference error is issued (block 204). Next, transactionOK is set equal to FALSE (block 205).

Returning to the decision diamond 201 (FIG. 11B), if the reference is not dependent (to FIG. 11C via a connector G) then a process sequence reserveForSignificant (illustrated in FIG. 13 and described further hereafter) is called (block 206). An inquiry is next made as to whether or not this call returned FALSE (diamond 207). If the answer to this inquiry is yes then a cannotReserveObject error is issued (block 208). Next, the transactionOK flag is set to FALSE (block 209). If the result of calling reserveForSignificant was not FALSE, then transactionOK is set equal to the result of calling the database interface function to set the value of the inverse (210).

Figure 11D:
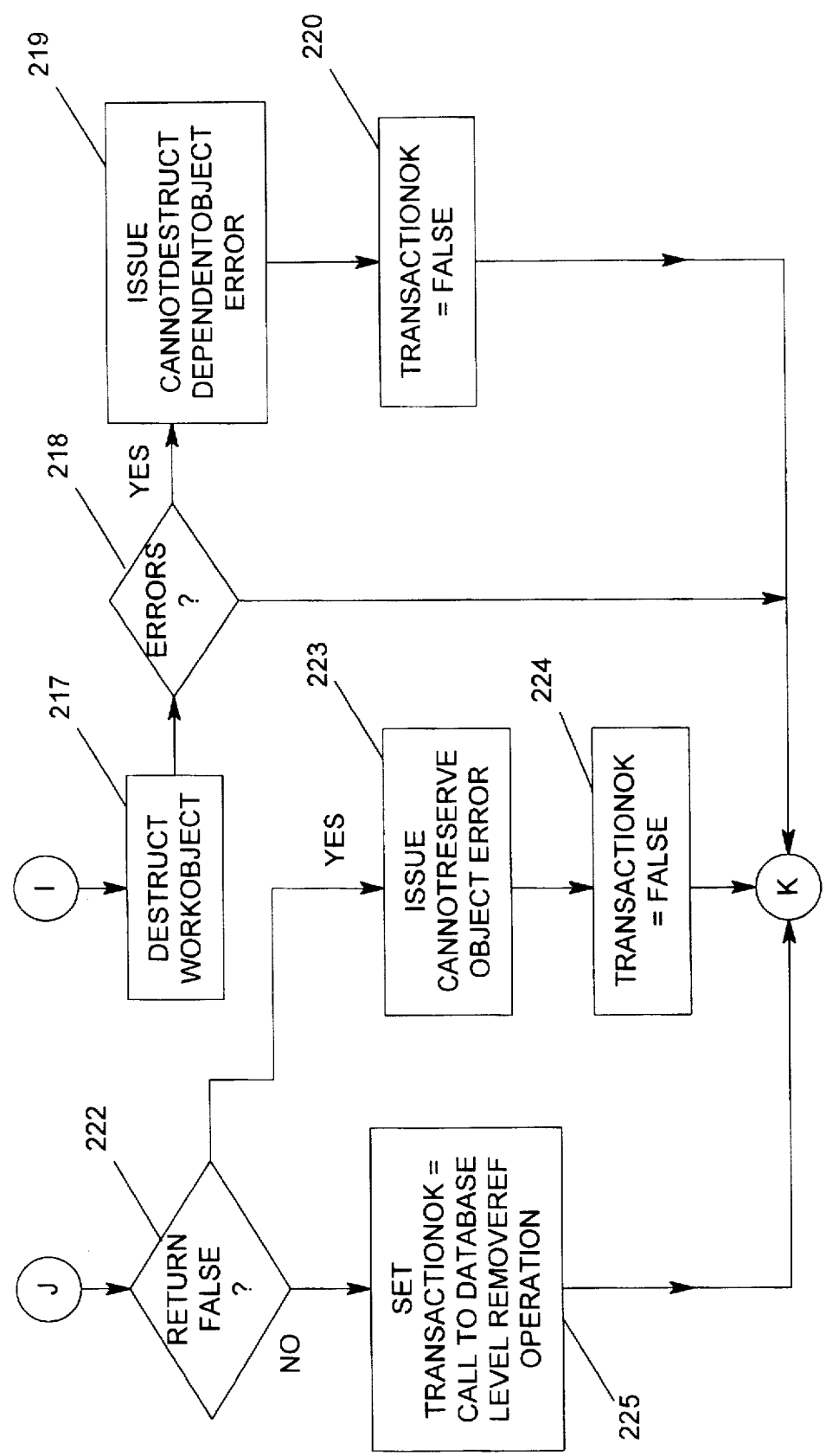

Returning to the decision diamond 198, (FIG. 11B) if inverseReference is not single-valued workObject is set equal to the next object in currentValue (block 211), followed by a calling of the getReferenceTrusted process sequence (set forth in FIG. 7) to get the value of the inverse (block 212). Next, an inquiry is made (in FIG. 11C via a connector H) as to whether or not there were any errors (diamond 213). If an error was found then a cannotRetrieveInverseValue error is issued (block 214), and transactionOK is set to FALSE (block 215). On the other hand, if no errors were found at diamond 213, then another inquiry is made as to whether or not reference is dependent (diamond 216). If the answer to this inquiry is yes, then currentValue is destructed (in FIG. 11D via a connector I block 217), followed by an inquiry as to whether or not there were any errors (diamond 218). If an error was detected, a cannotDestructDependentReference error is issued (block 219). Next, transactionOK is set equal to FALSE (block 220).

Returning to the decision diamond 216 (FIG. 11C), if reference is not dependent, then a process sequence reserveForSignificant is called (block 221). Next, an inquiry is made as to whether or not return is FALSE (in FIG. 11D via a connector J diamond 222). If return is FALSE, then a cannotReserveObject error is issued (block 223), followed by a process step of setting transactionOK equal to FALSE (block 224). On the other hand, if the call did not return FALSE, then transactionOK is set equal to the result of calling the database interface function to remove the target object from the inverse (block 225).

Figure 11E:
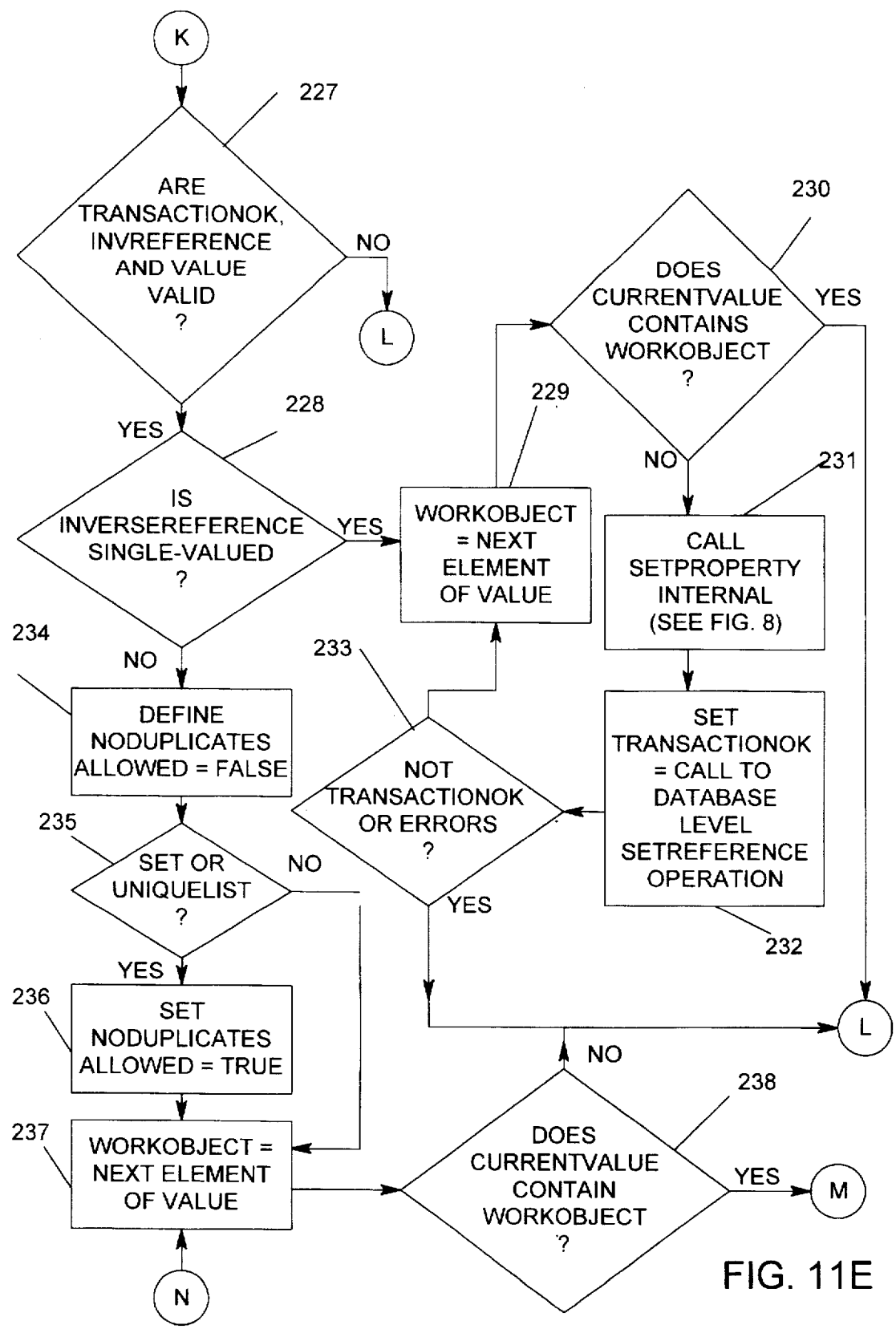
Figure 11F:
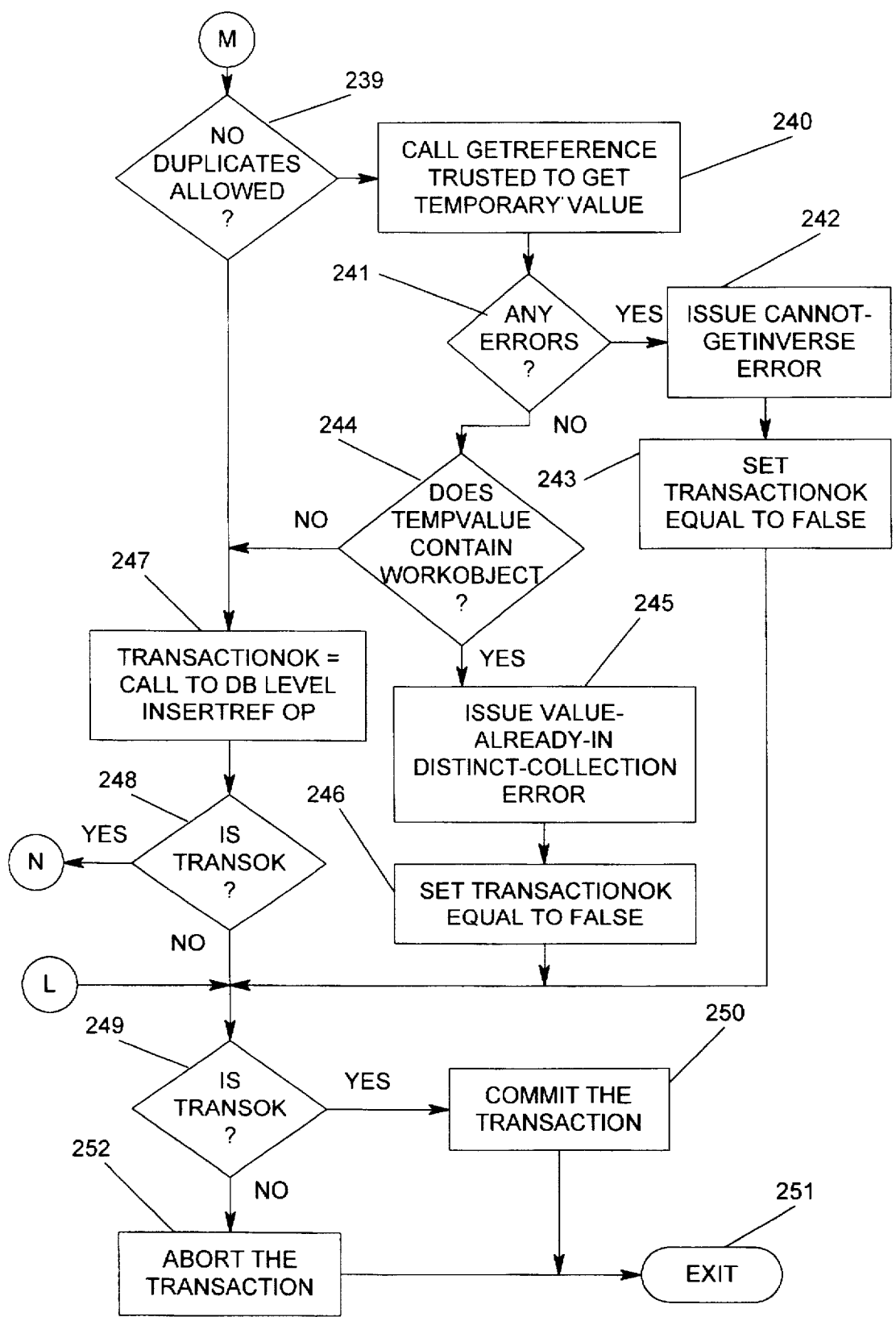

Referring now to FIG. 11E at the connector K, an inquiry is made as to whether or not transactionOK is TRUE and inverseReference and value are valid (diamond 227). If the answer to this inquiry is yes, then another inquiry is made as to whether or not inverseReference is single-valued (diamond 228). If the answer to this next inquiry is yes, then workObject is set equal to the next object in value (block 229). After this, an inquiry is made as to whether currentValue contains workObject (diamond 230). If the answer to this inquiry is no, then a process sequence setProperty-Internal (illustrated in FIG. 8) is called to null the value of the inverse (block 231). Next, transactionOK is set equal to the result of calling the database interface function to set the new value of the inverse to the target object (block 232). After this, another inquiry is made as to whether or not transactionOK is TRUE and there are no new errors (diamond 233). If the answer to this inquiry is no, then a return is made back to the process block 229 for the next workObject. If the answer to the inquiry at diamond 230 or 233 is yes, then a branch is taken to a subsequent (to-be-described) portion of the flow chart illustrated in FIG. 11F as denoted by a bubble L.

Returning to the diamond 228, if inverseReference is not single-valued a process step of defining a flag noDuplicatesAllowed equal to FALSE is performed (block 234). Next, an inquiry is made as to whether or not the inverse is a set or uniqueList (diamond 235). If the answer to this inquiry is yes, then a process step of setting noduplicatesallowed equal to TRUE is performed (block 236). After this, workObject is set equal to the next object in value (block 237). Note that if the answer to the inquiry at diamond 235 is no, then a branch is taken to the process block 237.

Following the process step depicted by the block 237, another inquiry is made as to whether or not currentValue contains workObject (diamond 238). If the answer to this inquiry is no, then another inquiry is made as to whether or not noduplicatesallowed is TRUE (in FIG. 11F via a connector M diamond 239). If the answer to this second inquiry is yes, then a process sequence getReferenceTrusted (illustrated in FIG. 6) is called to get tempValue (block 240). Next, yet another inquiry is made as to whether or not there were any errors (diamond 241). If an error was detected, then a cannotGetInverseValue error is issued (block 242), followed by a process step of setting transactionOK equal to FALSE (block 243).

Returning to the decision diamond 241, if no errors were found then another inquiry is made as to whether or not tempValue already contains workObject (diamond 244). If the answer to this inquiry is yes, then a valueAlreadyInDistinctCollection error is issued (block 245). Next, transactionOK is set equal to FALSE (block 246). On the other hand, if the answer at the diamond 244 is no, then transactionOK is set equal to the result of calling the database interface function to insert the target object in the inverse (block 247). After this, an inquiry is made as to whether transactionOK is TRUE (diamond 248). If the answer to this inquiry is yes, then a return is made back to the process block 237 in FIG. 11E.

On the other hand, if the answer to the inquiry at diamond 248 is no, then yet another inquiry is made as to whether or not transactionOK is TRUE (diamond 249). It is pointed out that the connector L is at the diamond 249 as well as the no branch of the diamond 227 (FIG. 11E). If the answer to the inquiry at diamond 249 is yes, then the transaction is committed (block 250) followed by an exit of the process (bubble 251). On the other hand if transactionOK is not TRUE, then the transaction is aborted (block 252) before exiting the process.

Figure 12A:
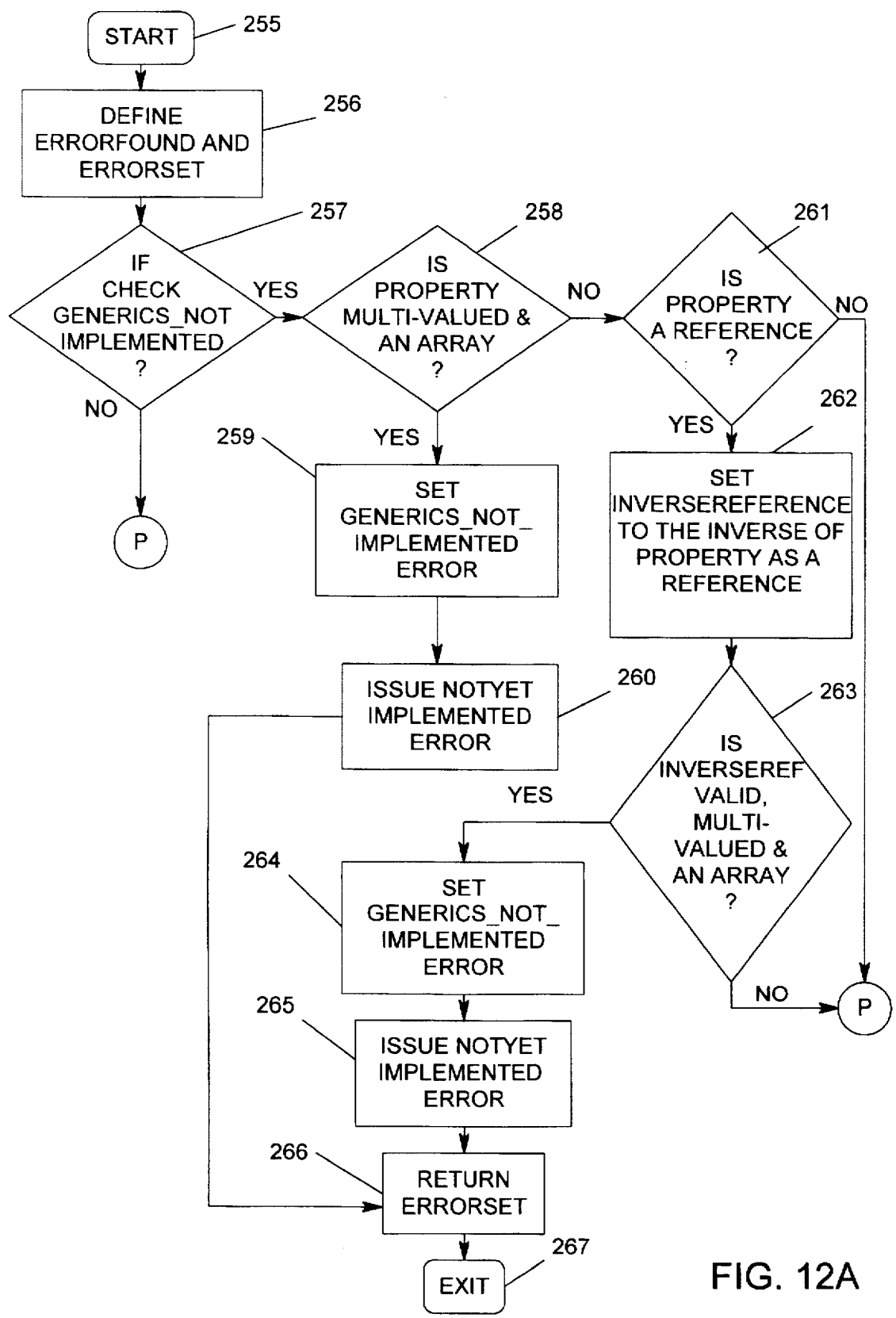

Referring now to FIG. 12A, the beginning of a Seven-sheet flow chart illustrates the checkGenericPreconditions process. The process begins with a start bubble 255, followed by a process step defining an errorFound flag and an errorSet integer (block 256). Next an inquiry is made as to whether or not checking condition CHECK_GENERICS_NOT_IMPLEMENTED (diamond 257). If the answer to this inquiry is yes, then another inquiry is made as to whether or not property is multi-valued and the collection type of property is array (diamond 258). If the answer to this inquiry is yes, the a process step of setting GENERICS_NOT_IMPLEMENTED error flag is performed (block 259). Next, a notYetImplemented error is issued (block 260).

On the other hand, if the answer to the inquiry at diamond 258 is no, then yet another inquiry is made as to whether or not property is a reference (diamond 261). If the answer to this inquiry is yes, then a process step of setting inverseReference to the meta reference which is the inverse of reference is performed (block 262). After this another inquiry is made as to whether or not it is valid multi-valued and the collection type of inverseReference is an array (diamond 263). If the answer to this inquiry is yes, then a GENERICS_NOT_IMPLEMENTED error flag is set (block 264). Next, a notYetImplemented error is issued (block 265), followed by a process step of returning the value of errorSet (block 266). Note that upon completion of the process step of block 260 entry is made to the process block 266. After this, the process is exited (bubble 267).

Returning to the decision diamond 257, if the answer to this inquiry is no then a branch is taken to the next sheet of the flow chart as denoted by a connector P. In a similar manner, the no branches of both the decision diamonds 261 and 263 lead to the connector P.

Figure 12B:
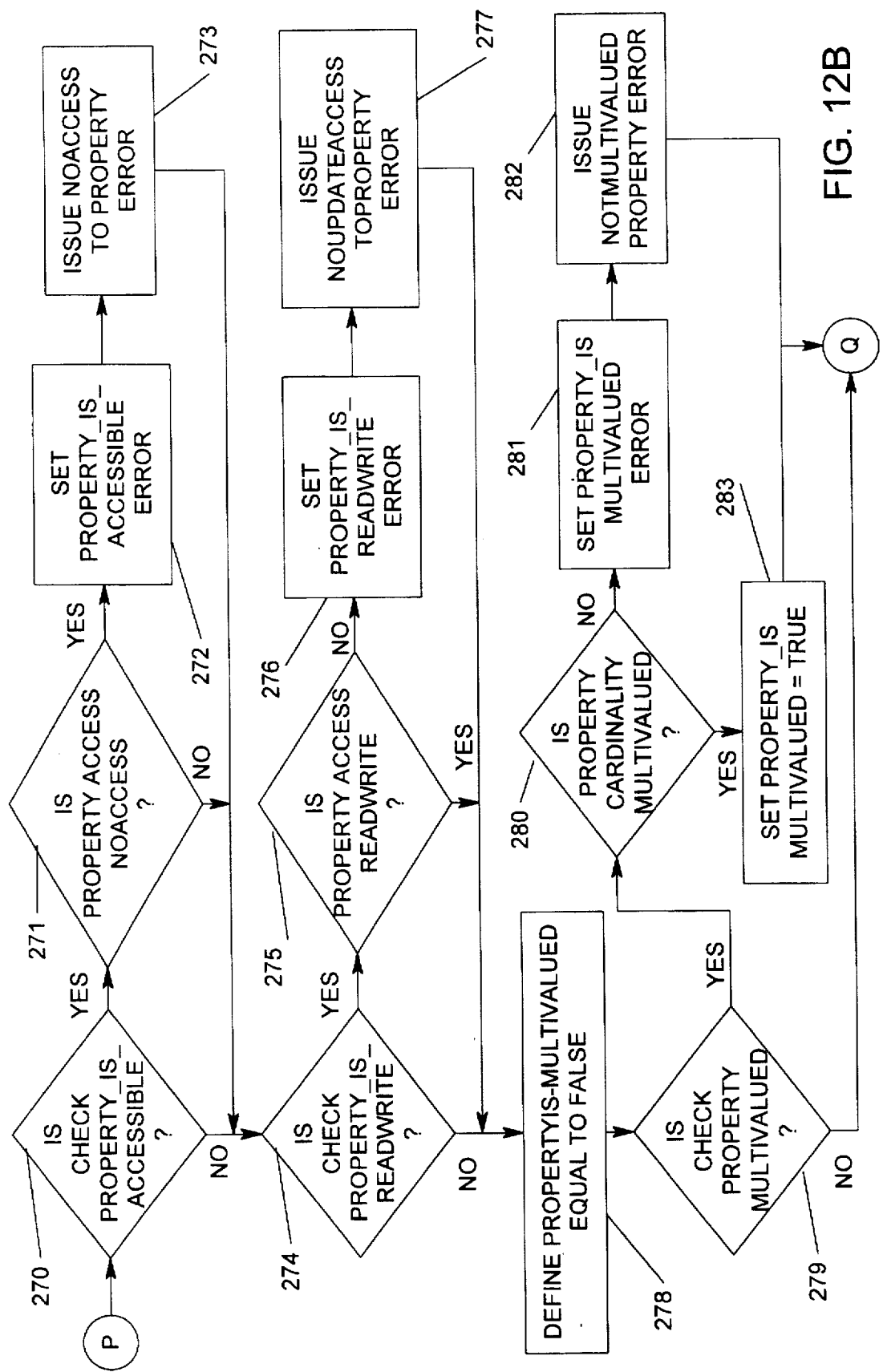

Referring now to FIG. 12B at the connector P, an inquiry is made if checking condition CHECK_PROPERTY_IS_ACCESSIBLE (diamond 270). If the answer to this inquiry is yes, then another inquiry is made as to whether or not access value of property is noAccess (diamond 271). If the answer to this second inquiry is yes, then a process step of setting PROPERTY_IS_ACCESSIBLE error flag is performed (block 272). Next, a noAccessToProperty error is issued (block 273). After this, yet another inquiry is made as to whether or not checking condition is CHECK_PROPERTY_IS_READWRITE (diamond 274). Also, if the answer to the inquiries in the diamonds 270 and 274 are no, then a branch is taken to the diamond 274.

If the answer to the inquiry at diamond 274 is yes, then another inquiry is made as to whether or not the access value of property is not readWrite (diamond 275). If the answer to this inquiry is no, then a process step of setting PROPERTY_IS_READWRITE error flag is performed (block 276), followed by issuing a noUpdateAccessToProperty error (block 277). After this, and if the answers to the inquiries in the diamonds 274 and 275 are no, a process step of defining a flag propertyIsMultivalued equal to FALSE (block 278).

An inquiry is next made as to whether or not checking condition CHECK_PROPERTY_IS_MULTIVALUED (diamond 279). If the answer to this inquiry is yes, then another inquiry is made as to whether or not the cardinality of property is multi-valued (diamond 280). If the answer to this inquiry is no, then propertyIsMultivalued is set (block 281), and a PROPERTY_IS_MULTIVALUED error flag is issued (block 282). If the cardinality value of property is not multi-valued a notMultivaluedProperty error is issued (block 283). Following completion of the steps of blocks 282 and 283, or if the answer in the diamond 279 is no, then a branch is made to the next sheet of the drawings as denoted by a connector Q.

Figure 12C:
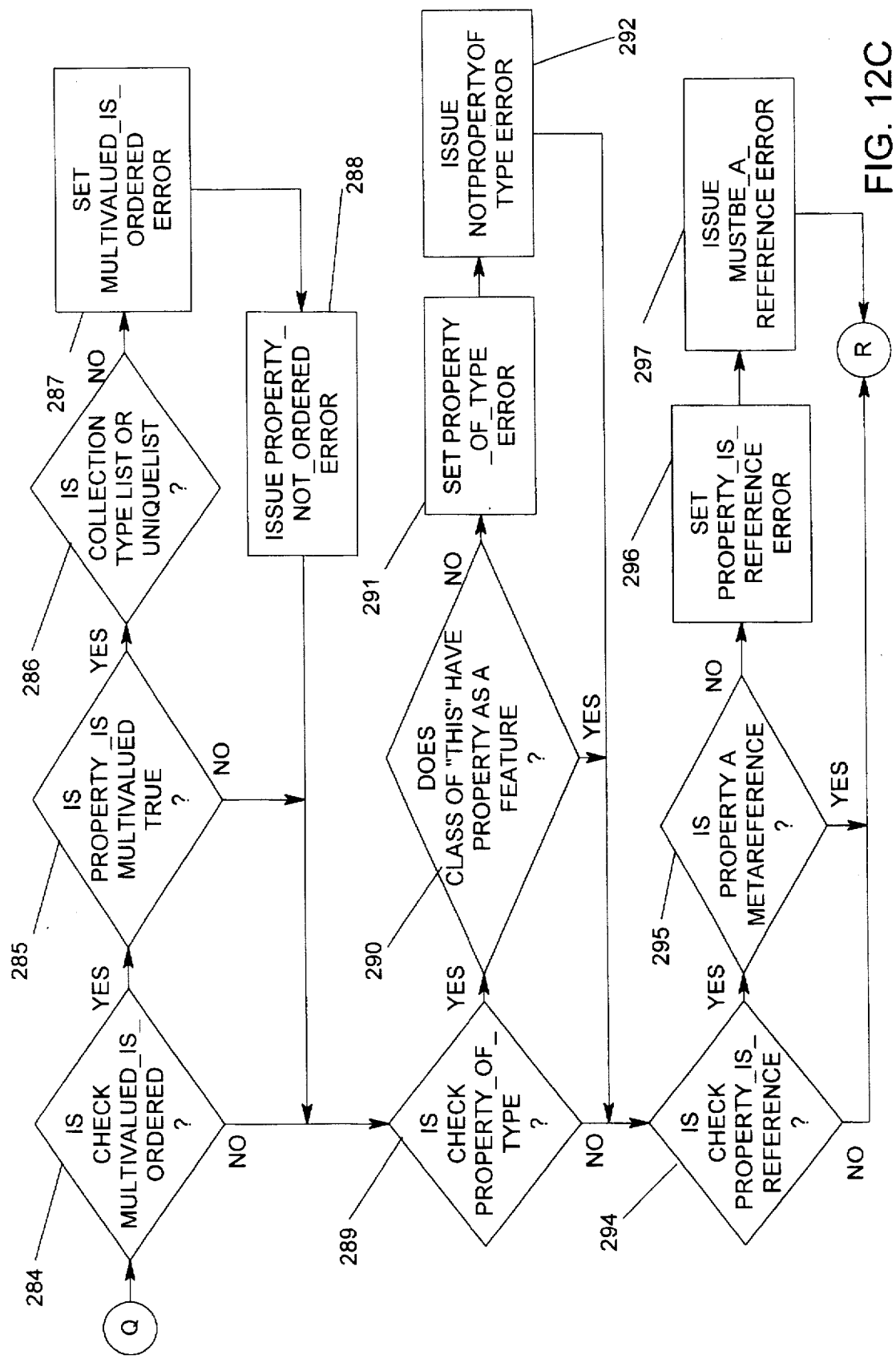

Referring now to FIG. 12C at the connector Q, another inquiry is made as to whether or not checking condition CHECK_MULTIVALUED_IS_ORDERED (diamond 284). If the answer to this inquiry is yes then yet another inquiry is made as to whether or not propertyIsMultivalued is TRUE (diamond 285), and if the answer to this inquiry is yes then still another inquiry is made as to whether or not collection type of property is not list or uniqueList (diamond 286). If the answer to this latter inquiry is no, then a MULTIVALUED_IS_ORDERED error flag is set (block 287). Next, a propertyIsNotOrdered error is issued (block 288).

After the step 288, or if the answers to the inquiries in the diamonds are no, then an inquiry is made as to whether or not checking condition CHECK_PROPERTY_OF_TYPE (diamond 289). If the answer to this inquiry is yes, then another inquiry is made as to whether or not the meta class of the target object does not have property as a feature (diamond 290). If the answer to this inquiry is no, then a PROPERTY_OF_TYPE error flag is set (block 291) followed by the issuing of a notPropertyOfType error (block 292).

Next, an inquiry is made as to whether or not checking condition CHECK_PROPERTY_IS_REFERENCE (diamond 294). If the answer to this inquiry is yes, then another inquiry is made as to whether or not property is a UrepMetaReference (diamond 295). If the answer to this inquiry is no then a PROPERTY_IS_REFERENCE error flag is set (block 296). Next, a mustBeReference error is issued (block 297). The process continues in FIG. 12D as denoted by a connector R. Referring now to FIG. 12D at the connector R, another inquiry is made as to whether or not checking condition CHECK_VALUE_IS_PERSISTENT (diamond 298). If the answer to this inquiry is yes, then an inquiry is made as to whether or not the classification of value is not aPersistentObject (diamond 299). If the answer to this inquiry is no, then a VALUE_IS_PERSISTENT error flag is set (block 300), followed by issuing an invalid-ValueTypeError (block 301).

After completion of step 301, and if the answer to the inquiry in diamond 298 is no, or in the diamond 299 is yes, then an inquiry is made as to whether or not checking condition CHECK_REQUIRED_NOT_NULL (diamond 302). If the answer to this inquiry is yes, then yet another inquiry is made as to whether or not value is null and property is required (block 303). If the answer to this inquiry is no, then a REQUIRED_NOT_NULL error flag is set (block 304 ), followed by issuing a requiredPropertyWill-BeNull error (block 305). After step 305 and if the answer in the diamond 302 is no and in the diamond 303 is yes, then another inquiry is made as to whether or not checking condition CHECK_VALUE_MATCHES_CARDINALITY matches (diamond 306). If the answer to this inquiry is yes, then an extensive inquiry is made as to whether or not: classification of value is aPersistentObject and property cardinality is single-valued; or, classification of value is a UrepCollection and property cardinality is multi-valued; or, classification of value is aDataType and property cardinality is single-valued. If the answer to this inquiry is no, then a branch is taken to FIG. 12E, at a connector T wherein a process step of setting a VALUE_MATCHES_CARDINALITY error flag (block 308). Next, an invalid-ValueCardinality error is issued (block 309).

Figure 12E:
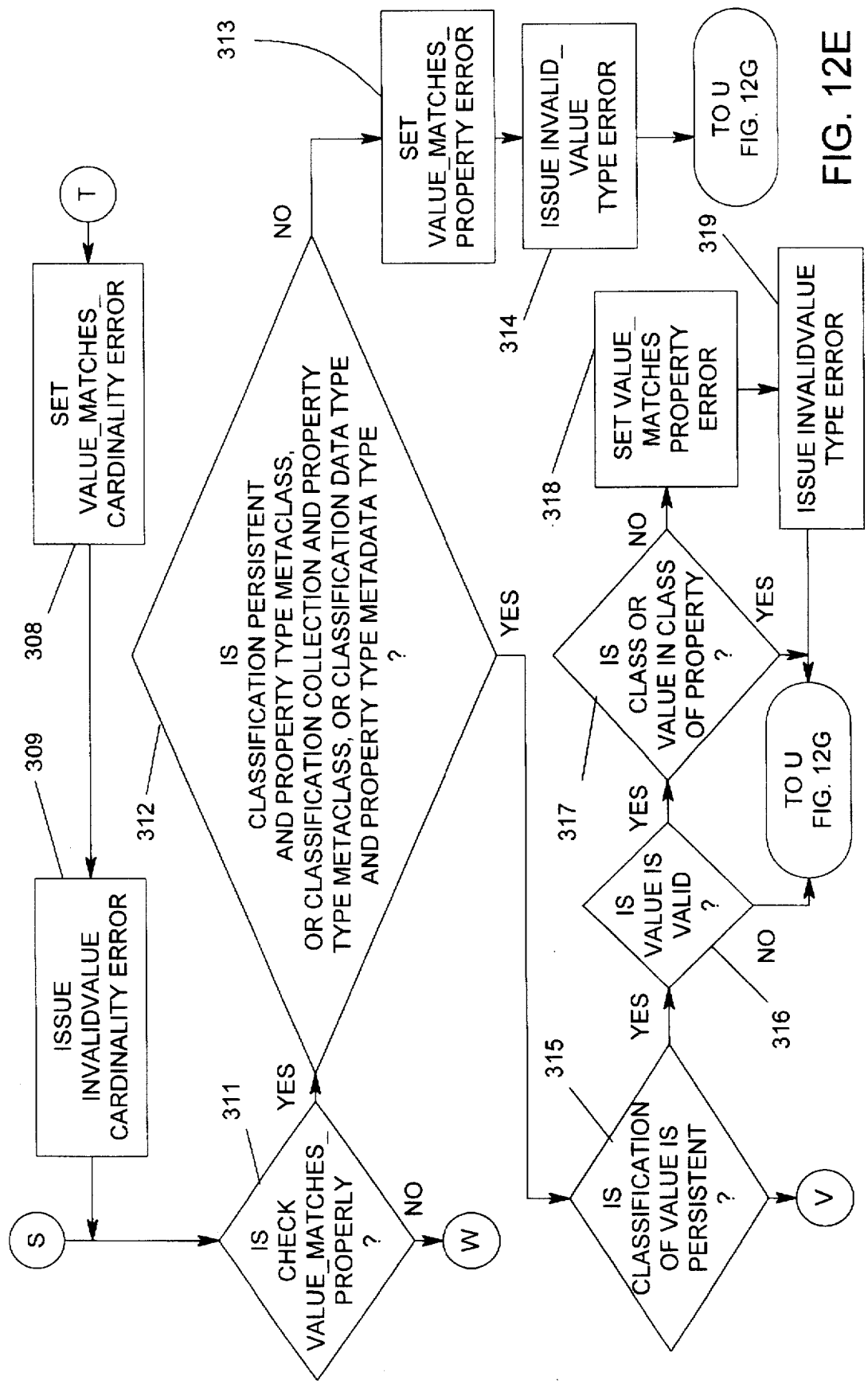

Referring back to FIG. 12D, if the answer to the inquiry in the diamond 306 is no, or in the diamond 307 is yes, then a branch is taken to FIG. 12E at a connector S wherein, an inquiry is made as to whether or not checking condition CHECK_VALUE_MATCHES_PROPERTY matches (diamond 311). If the answer to this inquiry is yes, then an extensive inquiry is made if not any of: classification of value is aPersistentObject and property type is a UrepMetaClass; or, classification of value is a UrepCollection and property type is a UrepMetaClass; or, classification of value is a data type and property type is a UrepMetaDataType (diamond 312). If the answer to this inquiry is no, then a VALUE_MATCHES_PROPERTY error flag is set (block 313), followed by issuing an invalidValueType error (block 314). The next step on this path is shown in FIG. 12G (at a connector U), and amplified hereinafter.

If the answer to the inquiry at diamond 312 is yes, then an inquiry is made if classification of value is aPersistentObject (diamond 315). If the answer to this inquiry is yes, then another inquiry is made if value is valid (diamond 316), and if yes, yet another inquiry is made if the class of the value is not within the class of the property (diamond 317). If the answer to this inquiry is no, then a VALUE_MATCHES_PROPERTY error flag is set (block 318), followed by issuing an invalidValueType error (block 319).

Figure 12F:
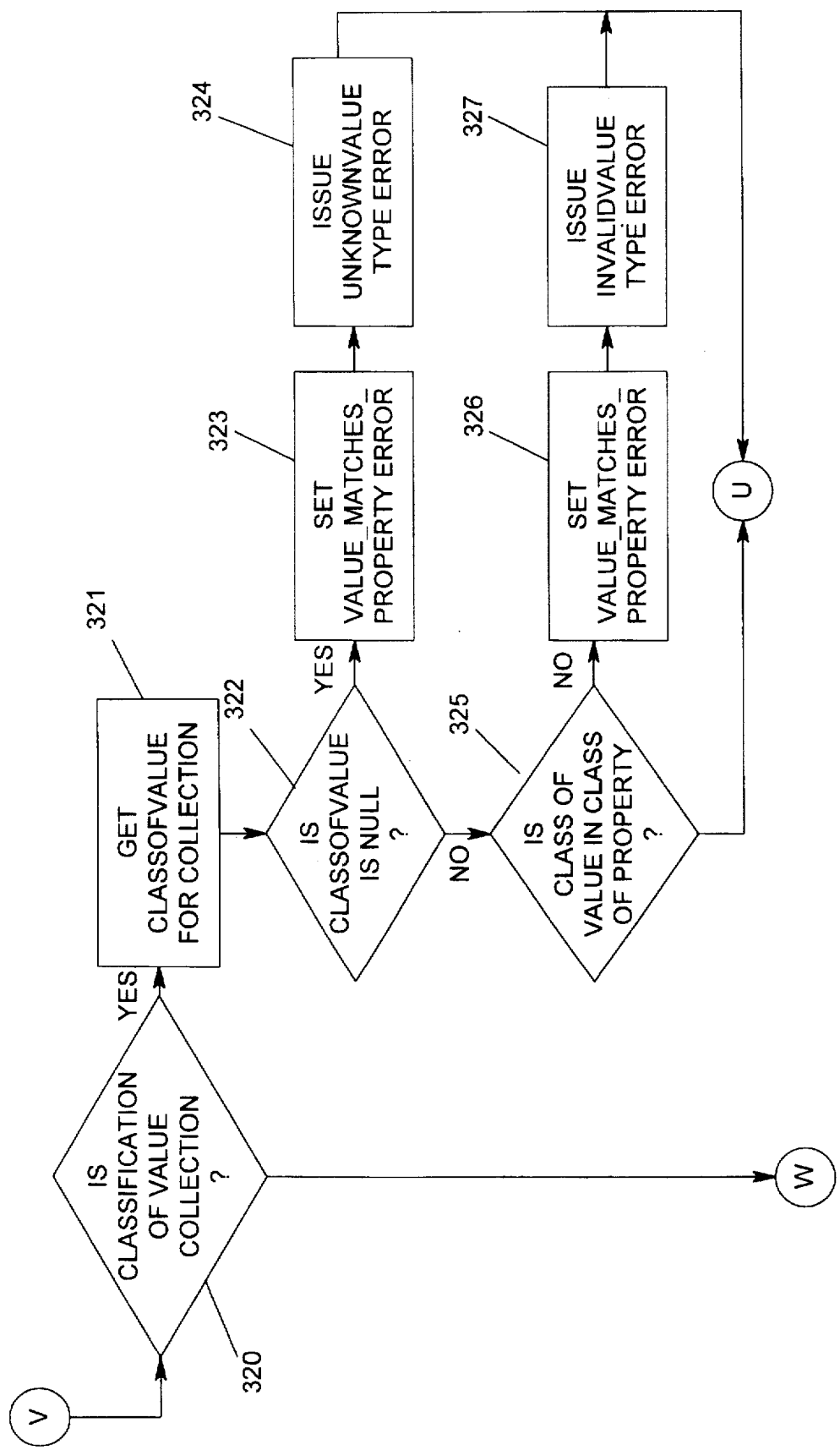
Figure 12G:
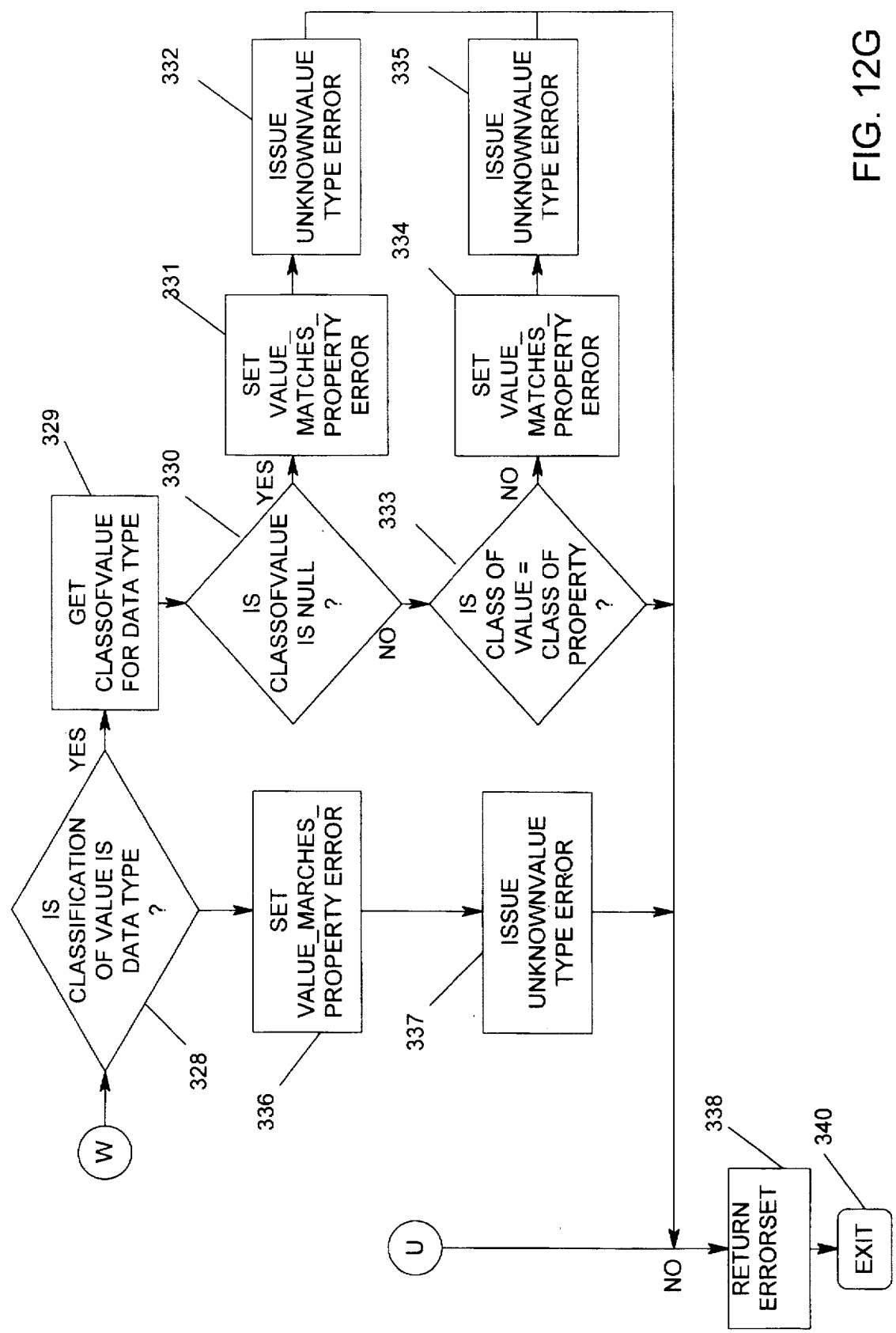

If the answer to the inquiry at diamond 315 is no, then a branch is taken to FIG. 12F (at a connector V) where another inquiry is made if classification of value is UrepCollection (diamond 320). If the answer to this inquiry is yes, then a process step of getting the classOfValue for the collection type value is performed (block 321). Still another inquiry is made if classOfValue is null (diamond 322), and if yes a VALUE_MATCHES_PROPERTY error flag is set (block 323), followed by issuing an invalidValueType error (block 324).

If the answer to the inquiry at diamond 322 is no, then another inquiry is made if classOfValue is not within the class of property (diamond 325). If the answer to this inquiry is no, then a VALUE_MATCHES_PROPERTY error flag is set (block 326), followed by issuing an invalidValueType error (block 327). Returning to the decision diamond 320, if the answer to this inquiry is no, then a branch is taken to FIG. 12G at a connector W, where another inquiry is made if classification of value is aUrepDataType (diamond 328). If the answer to this inquiry is yes, then a process step of getting the classOfValue for the data typed value is performed (block 329). Next, an inquiry is made if classOfValue is null (diamond 330). If the answer to this inquiry is yes, then a process step of setting VALUE_MATCHES_PROPERTY error flag is performed (block 331), followed by issuing an invalidValueType error (block 332).

If the answer at decision diamond 330 is no, then another inquiry is made if classOfValue does not match the class of the property (diamond 333). If the answer to this inquiry is no, then a VALUE_MATCHES_PROPERTY error flag is set (block 334) followed by issuing an invalidValueType error (block 335). If the answer to the inquiry at diamond 328 is no, then classOfValue does not match the class of the property. Thus, a VALUE_MATCHES_PROPERTY error flag is set (block 336) and an inalidValueType error is issued (block 337).

Returning to the decision diamond 311, if checking condition is not CHECK_VALUE_MATCHES_PROPERTY, then the value of errorSet is returned (block 338) and the process is exited (bubble 340).

Figure 13:
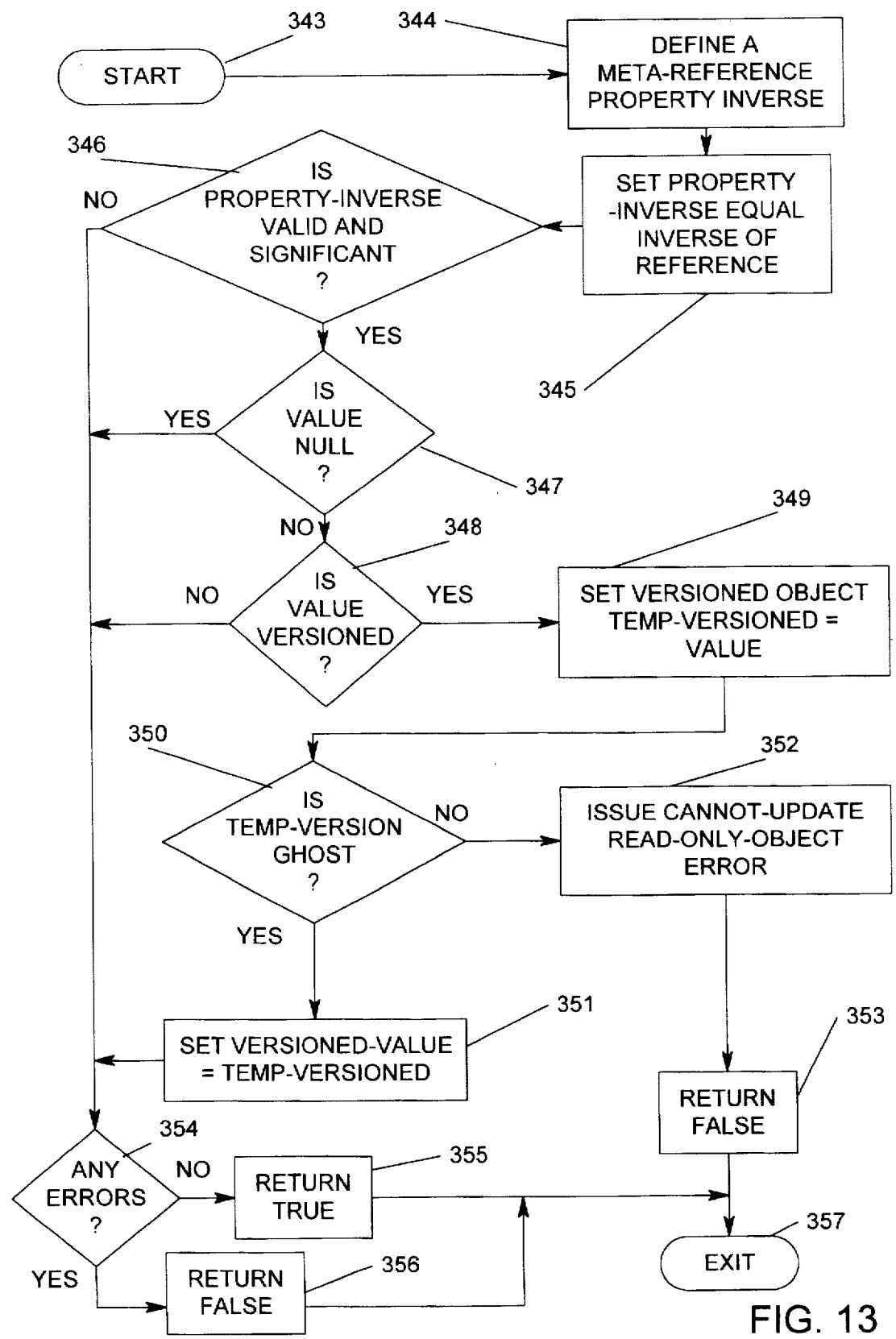
FIG. 13 is a flow chart illustrating the steps of the process for recovering an object based the significance of a property (i.e., reserveForSignificant).

Referring now to FIG. 13, a flow chart illustrates the reserveForSignificant process. The process begins with a start bubble 343 followed by a process defining a local variable of propertyInverse of type UrepMetaReference (block 344). Next, a process step of setting propertyInverse equal to the inverse of reference is performed (block 345). After this, an inquiry is made if propertyInverse is valid and propertyInverse is significant (diamond 346). If the answer to this inquiry is no, then another inquiry is made if value is not null (diamond 347). If the answer to this inquiry is no, then yet another inquiry is made if value is versioned (diamond 348).

A process step of defining a local UrepVersionedObject tempVersioned, which is just value, is performed (block 349). Next, an inquiry is made if tempVersioned is in a ghost state (diamond 350). If the answer to this inquiry is yes, then a process step of setting versionedValue equal to tempVersioned is performed (block 351). On the other hand, if tempVersioned is not in a ghost state, then a process step of issuing a cannotUpdateReadonlyObject error (block 352). Next, FALSE is returned (block 353).

Returning to the decision diamonds 346 and 348, if the answer to either of these inquiries is a no, or 347 is yes then another inquiry is made as to whether or not there were any errors (diamond 354). If the answer to this inquiry is no then a TRUE is returned (block 355); and, if the answer is yes then a FALSE is returned (block 356), followed by an exit from the process bubble 357.

In summary, FIG. 2 mainly serves as a unifier of the get and set property operations. In getProperty, the beginning steps of the operation (FIG. 3) are mainly concerned with validating the input. This is done because of the generic nature of the operation. We are being asked to retrieve some arbitrary property about some arbitrary instance in the repository.

Within the model of the repository, there are a number of constraints. Because it is an arbitrary property, one must make sure that they don't violate any constraints by retrieving the object. Particularly in the case of getProperty, if some property is private, then it is not allowed to return it. The checkGeneric Preconditions this validation call would check things like that and calls an internal helper function getPropertyTrusted. This is not embodied in getProperty because as a helper function is actually used by other member operations of the Persistent Service. In FIG. 4, which is the setProperty, and the converse of FIG. 3, again prevalidation is done for the same reason. In this case, it is quite a bit more extensive. The constraints play a much larger part. For example, a property may be in the repository as, for example, a UREP user object. Because the value being passed in is an arbitrary item, we have to check that we were in fact given an UREP user object. The property may be read only as opposed to rewrite. So that would have to be validated insuring that the person can actually perform an update.

Referring back to FIG. 3, there is a set of constraints associated with properties and the values that can be set to properties, which is all embodied in one place. This operation, like getProperty, calls an internal function setPropertyInternal for the same reason. It is used by other aspects of the Persistent Service, and it was an implementation mechanism to share the code.

In FIG. 5, it is essentially a further breakdown of getPropertyTrusted and again it is done for the same reason, i.e. to facilitate sharing of code with other operations. If it happens to be an attribute, we are going to call the getAttribute a trusted function. If it is a reference, we are going to call the getReferenceTrusted function. These are called trusted functions because they are not doing any validation, and the caller assumes that someone who called them has done the validation.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a user interface, a memory, a repository program operating in said computer system for generically manipulating a property of an object stored in said repository, given an identification of said property and its desired new value, referred to as parameters, said program executing a method comprising the steps of:
   a. specifying constraints to be checked on said parameters;
   b. validating said parameters by looking up metadata needed to check each of said constraints specified in the preceding step;
   c. if no errors are detected in the preceding step, setting a local variable valueClassification equal to the classification of value;
   d. if valueClassification is a persistent object, calling a setProperty_Persistent operation to set value of said property and exiting said method.

2. The method as in claim 1 wherein said step of calling setProperty_Persistent further includes the steps of:
   a. calling getReferenceTrusted to retrieve current value of said property, tempValue;
   b. if tempValue is the same as the old value, exiting said setProperty_Persistent procedure;
   c. retrieving meta reference that is the inverse of said reference property;
   d. calling database level function to set said new value of said property;
   e. if inverse reference and current value are valid and if reference is single-valued and if reference is dependent, destructing said dependent object;
   f. if the inverse of said reference and said new value are valid, and if said inverse reference is single-valued, setting the inverse to reference said target object;
   g. if there are no errors, committing all changes; and,
   h. exiting said setProperty_Persistent procedure.

3. The method as in claim 2 wherein in step e thereof if said reference is not dependent, removing said target object from said inverse reference.

4. The method as in claim 2 wherein in step e thereof if said reference is multi-valued, retrieving the current value of said inverse; and, said inverse is dependent and its size is one, destructing said dependent object.

5. The method as in claim 4 wherein if said inverse is independent or its size is not equal to one, removing said target object from said inverse reference.

6. The method as in claim 2 wherein in step e thereof if said inverse reference is multi-valued, adding said target object to said inverse reference.

7. The method as in claim 2 wherein if there were errors aborting any changes made and exiting said setProperty_Persistent procedure.

23

8. The method as in claim 1 wherein if said valueClassification is a collection, further including the step of calling setProperty_Collection to set the value of said property.

9. The method as in claim 8 wherein said step of calling setProperty_Collection further includes the steps of:
   a. calling getReferenceTrusted to retrieve current value of said property, tempValue;
   b. if tempValue is the same as old value, exiting said setProperty_Collection procedure;
   c. retrieving meta reference which is the inverse of said property;
   d. calling a database level function to set a new value of said property;
   e. if inverse reference and current value are valid, and if inverse reference is single-valued, for each member of current value, if member is not already in said new value and if said reference is dependent, destructing said dependent object;
   f. if there are more objects in current value, returning to said step e above;
   g. if said inverse reference and said new value are valid and if said inverse reference is single-valued, for each member of current value if said member is not already in said new value, setting said inverse reference to said target object;
   h. if there are more objects in said current value, returning to said step g above;
   i. if there were no errors, committing all changes made and exiting said set_Property Collection procedure.

10. The method as in claim 9 wherein in said step e, if said reference is not dependent, setting said inverse value to null.

11. The method as in claim 9 wherein in said step e, if said inverse reference is multi-valued, for each member of current value if member is not already in new value, calling getReferenceTrusted to get said inverse value; and, if said reference is dependent and the size of the inverse value is one, destructing said dependent object.

12. The method as in claim 11, if said reference is not dependent or the size of said inverse value is not equal to one, removing said target object from said inverse reference; and, if there are more objects in current value repeating said step of claim 18.

13. The method as in claim 9 wherein if said inverse value or said new value are not valid, if said inverse reference is multi-valued, for each member of current value, if member is not already in said new value, and if duplicates are not allowed in said inverse, calling getReferenceTrusted to retrieve said inverse value.

14. The method as in claim 13 wherein if said inverse value already contains said target object repeating said steps in claim 21.

15. The method as in claim 9 wherein if there were any errors aborting any changes made and exiting said setProperty_Collection procedure.

16. The method as in claim 1 wherein if said valueClassification is a data type, further including the step of calling setProperty_DataType to set the value of said property.

17. The method as in claim 16 wherein said step of calling setProperty_DataType further includes the steps of:
   a. setting a local variable currentValue equal to the result of calling getAttributeTrusted for said property;
   b. defining a local transactionOK equal to TRUE;
   c. if value is a UrepBlob and is not null, adding target object as owner of value
   d. calling database interface function to set value of said attribute returned;

24 e. if currentValue is not null, setting up content sharing between sharing between currentValue and value;
   f. removing target object as owner of currentValue;
   g. if value is a UrepText and not null, adding target object as owner of value of said attribute;
   h. removing target object as owner of currentValue;
   i. if value is not a UrepText, calling database interface function set value of attribute;
   j. if transactionOK is TRUE, committing transaction; and,
   k. exiting said setProperty_DataType procedure.

18. In a computer system having a user interface, a memory, a repository and a database, a repository program operating in said computer system for generically manipulating properties of objects stored in said repository, given an identification of said property and its desired new value, referred to as parameters, said program executing a method comprising the steps of:
   a. specifying constraints to be checked on said parameters;
   b. validating said parameters by looking up metadata needed to check each of said constraints specified in the preceding step;
   c. if metadata indicates that a constraint is being violated, setting an error flag for said current one of check flags and issuing an error message to indicate type of violation;
   d. inquiring if there are more check flags, and if so repeating steps b through d hereof;
   e. calling a getPropertyTrusted operation to retrieve property value;
   f. determining if said property value is to be changed, and if so;
   g. if the result of said preceding steps is satisfactory, with no errors, performing the following steps:
      i. setting a local variable valueClassification equal to the classification of value;
      ii. if valueClassification is aPersistentObject, calling setProperty_Persistent operation to set the value of said property;
      iii. if valueClassification is aUrepCollection, calling setProperty_Collection to set the value of said property;
      iv. if valueClassification is aDataType, calling setProperty_DataType to set the value of said property; and,
   h. exiting said method.

19. The method as in claim 18 wherein said step of calling setProperty_Persistent further includes the steps of:
   a. calling getReferenceTrusted to retrieve current value of said property, tempValue;
   b. if tempValue is the same as the old value, exiting said setProperty_Persistent procedure;
   c. retrieving meta reference that is the inverse of said reference property;
   d. calling database level function to set said new value of said property;
   e. if inverse reference and current value are valid and if reference is single-valued and if reference is dependent, destructing said dependent object;
   f. if the inverse of said reference and said new value are valid, and if said inverse reference is single-valued, setting the inverse to reference said target object;
   g. if there are no errors, committing all changes; and, h. exiting said setProperty_Persistent procedure.

20. The method as in claim 19 wherein step e thereof if said reference is not dependent, removing said target object from said inverse reference.

21. The method as in claim 19 wherein in step e thereof if said reference is multi-valued, retrieving the current value of said inverse; and, if said inverse is dependent and its size is one, destructing said dependent object.

22. The method as in claim 21 wherein if said inverse is independent or its size is not equal to one, removing said target object from said inverse reference.

23. The method as in claim 19 wherein in step e thereof if said inverse reference is multi-valued, adding said target object to said inverse reference.

24. The method as in claim 19 wherein if there were errors aborting any changes made and exiting said setProperty_Persistent procedure.

25. The method as in claim 18 wherein said step of calling setProperty_Collection further includes the steps of:

a. calling getReferenceTrusted to get current value of said property, tempValue;
   b. if tempValue is the same as old value, exiting said setProperty_Collection procedure;
   c. retrieving meta reference which is the inverse of said property;
   d. calling a database level function to set a new value of said property;
   e. if inverse reference and current value are valid, and if inverse reference is single-valued, for each member of current value, if member is not already in said new value and if said reference is dependent, destructing said dependent object;
   f. if there are more objects in current value, returning to said dependent object;
   g. if said inverse reference and said new value are valid and if said inverse reference is single-valued, for each member of current value if said member is not already in said new value, setting said inverse reference to said target object;
   h. if there are more objects in said current value. returning to said step g above;
   i. if there were no errors, committing all changes made and exiting said set_PropertyCollection procedure.

26. The method as in claim 25 wherein in said step e, if said reference is not dependent, setting said inverse value to null.

27. The method as in claim 25 wherein in said step e, if said inverse reference is multi-valued, for each member of current value if member is not already in new value, calling getReferenceTrusted to get said inverse value; and, if said reference is dependent and the size of the inverse value is one, destructing said dependent object.

28. The method as in claim 27, if said reference is not dependent or the size of said inverse value is not equal to one, removing said target object from said inverse reference; and, if there are more objects in current value repeating said step of claim 26.

29. The method as in claim 25 wherein if said inverse value or said new value are not valid, if said inverse reference is multi-valued, for each member of current value, if member is not already in said new value, and if duplicates are not allowed in said inverse, calling getReferenceTrusted to retrieve said inverse value.

30. The method as in claim 29 wherein if said inverse value already contains said target object repeating said steps in claim 29.

31. The method as in claim 25 wherein if there were any errors aborting any changes made and exiting said setProperty_Collection procedure.

32. The method as in claim 18 wherein said step of calling setProperty_DataType further includes the steps of:

a. setting a local variable currentValue equal to the result of calling getAttributeTrusted for said property;
   b. defining a local transactionOK equal to TRUE;
   c. if value is a UrepBlob and is not null, adding target object as owner of value
   d. calling database interface function to set value of said attribute returned;
   e. if currentValue is not null, setting up content sharing between currentValue and value;
   f. removing target object as owner of currentValue;
   g. if value is a UrepText and not null, adding target object as owner of value of said attribute;
   h. removing target object as owner of currentValue;
   i. if value is not a UrepText, calling database interface function to set value of attribute;
   j. if transactionOK is TRUE, committing transaction; and,
   k. exiting said method.

* * * * *